US011102264B2

(12) United States Patent
Pather et al.

(10) Patent No.: US 11,102,264 B2
(45) Date of Patent: Aug. 24, 2021

(54) METHODS AND SYSTEMS FOR INITIATING A COORDINATED EFFECT

(71) Applicant: Facebook, Inc., Menlo Park, CA (US)

(72) Inventors: Shyamalan Pather, Seattle, WA (US); Michelle Ruby Hwang, Seattle, WA (US); Nora Micheva, Seattle, WA (US)

(73) Assignee: FACEBOOK, INC., Menlo Park, CA (US)

( * ) Notice: Subject to any disclaimer, the term of this patent is extended or adjusted under 35 U.S.C. 154(b) by 780 days.

(21) Appl. No.: 15/869,926

(22) Filed: Jan. 12, 2018

(65) Prior Publication Data

US 2019/0222620 A1    Jul. 18, 2019

(51) Int. Cl.

| A63F 13/34 | (2014.01) |
|---|---|
| G06F 12/00 | (2006.01) |
| G06F 3/01 | (2006.01) |
| G06Q 10/00 | (2012.01) |
| H04N 7/24 | (2011.01) |
| H04L 29/06 | (2006.01) |

(Continued)

(52) U.S. Cl.
CPC ............ *H04L 65/601* (2013.01); *G06F 9/543* (2013.01); *G06F 9/547* (2013.01); *H04L 65/608* (2013.01); *H04N 7/147* (2013.01); *H04N 21/4312* (2013.01); *H04N 21/4788* (2013.01); *H04N 5/44504* (2013.01); *H04N 7/15* (2013.01)

(58) Field of Classification Search
None
See application file for complete search history.

(56) References Cited

U.S. PATENT DOCUMENTS 7,865,834 B1    1/2011  Van Os et al.
2001/0044826 A1    11/2001  Ludwig
(Continued)

FOREIGN PATENT DOCUMENTS

| EP | 1689155 A1 | 8/2006 |
|---|---|---|
| WO | 2009148413 A1 | 12/2009 |
| WO | 2013172657 A1 | 11/2013 |

OTHER PUBLICATIONS

European Search Report for the European Patent Application No. EP18187097, dated Jan. 30, 2019, 11 pages.
(Continued)

*Primary Examiner* — Nicholas R Taylor
*Assistant Examiner* — Ho T Shiu
(74) *Attorney, Agent, or Firm* — Kacvinsky Daisak Bluni PLLC

(57) ABSTRACT

Exemplary embodiments relate to the application of media effects to visual data such as a video. A coordinated activity protocol is provided for synchronizing interactive effects and experiences across multiple devices. The protocol allows effects to be initiated and coordinated on multiple devices via a real-time communications (RTC) channel. Messages may be exchanged to cooperatively initiate the effect, and (once initiated) generic data may be exchanged via application programming interface (API) calls. Accordingly, the system is both data-type and platform agnostic, allowing effects developers to define how data will be interpreted. In some embodiments, higher-level services may be provided to exchange data of predefined types (e.g., for common activities such as turn negotiations, turn yielding, scorekeeping, leadership elections, etc.).

17 Claims, 17 Drawing Sheets

(51) Int. Cl.
    *G06F 9/54*         (2006.01)
    *H04N 21/431*    (2011.01)
    *H04N 7/14*        (2006.01)
    *H04N 21/4788*   (2011.01)
    *H04N 5/445*      (2011.01)
    *H04N 7/15*        (2006.01)

(56) References Cited

U.S. PATENT DOCUMENTS

| | | |
|---|---|---|
| 2011/0273526 A1 | 11/2011 | Mehin et al. |
| 2013/0332856 A1 | 12/2013 | Sanders et al. |
| 2014/0108568 A1* | 4/2014 | Lee .................... H04L 65/4015 |
| | | 709/206 |
| 2014/0235326 A1 | 8/2014 | Paracha et al. |
| 2015/0135059 A1 | 5/2015 | Liang et al. |
| 2015/0352446 A1 | 12/2015 | Ma et al. |
| 2016/0112469 A1 | 4/2016 | Liu |
| 2016/0212265 A1* | 7/2016 | Philonenko ......... H04M 3/5183 |
| 2016/0346690 A1* | 12/2016 | Ramachandran .. A63B 71/0669 |
| 2017/0208291 A1 | 7/2017 | Feng et al. |
| 2018/0001209 A1 | 1/2018 | Verfaillie et al. |
| 2018/0131878 A1* | 5/2018 | Charlton .......... H04N 5/232945 |
| 2018/0160055 A1 | 6/2018 | Taine et al. |

OTHER PUBLICATIONS

International Search Report and Written Opinion for the International Patent Application No. PCT/US2018/014634, dated Oct. 12, 2018.

* cited by examiner

Effect Coordination Logic
220

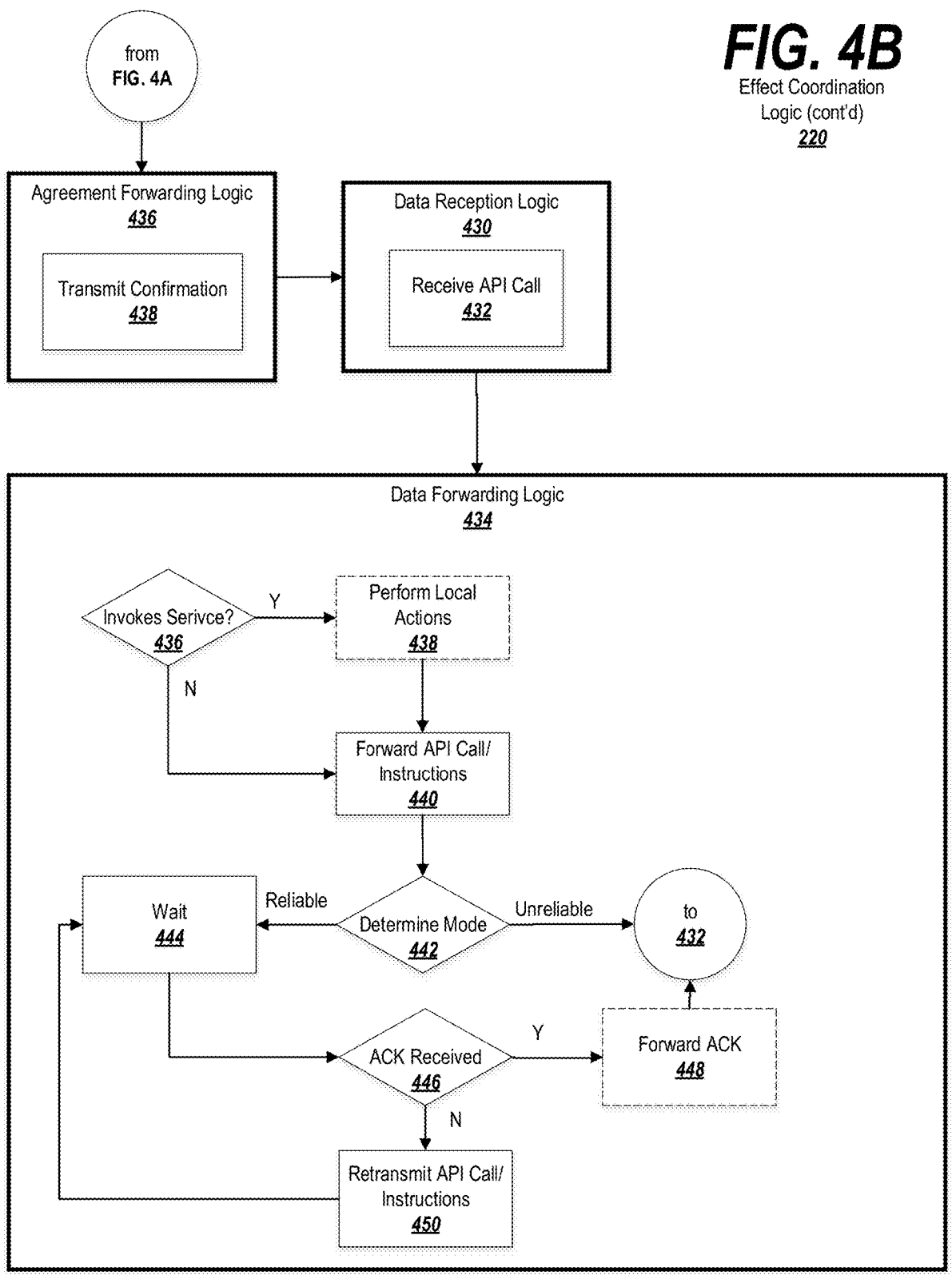

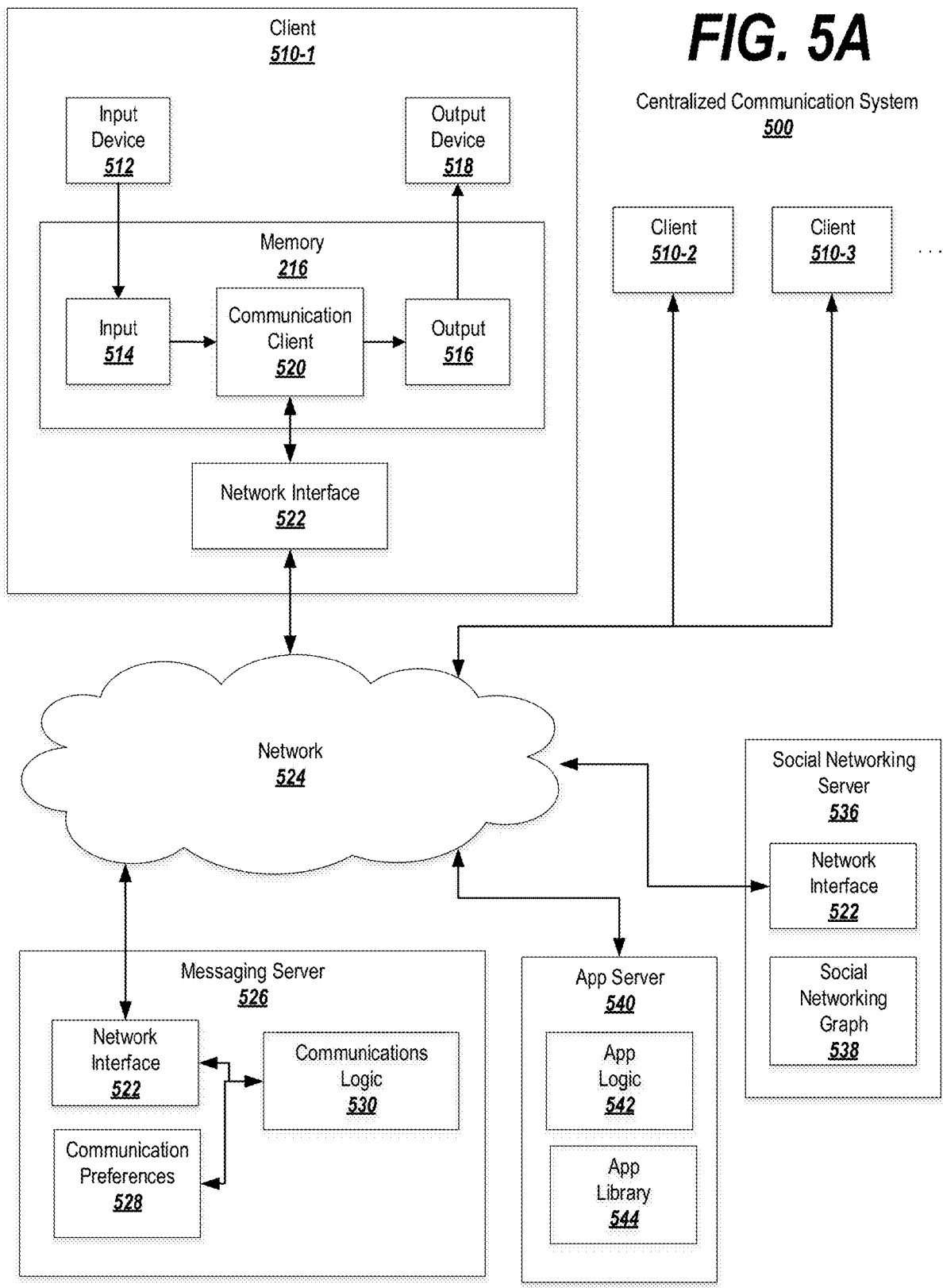

Distributed Communication System 550

METHODS AND SYSTEMS FOR INITIATING A COORDINATED EFFECT

BACKGROUND

Media effects, such as facial mask overlays, added graphics, changed backgrounds, etc. may be applied to a video stream. Generally, media effects have been applied by a user to modify that user's own video feed (e.g., applying a mask to the user's own face). Such transactions can be handled in a relatively straightforward manner, because the user's own device initiates the media effect, retrieves any information necessary to apply the media effect, and either modifies the user's video stream, or sends a central server all the information necessary to make the modification.

BRIEF DESCRIPTION OF THE DRAWINGS

FIGS. 4A-4B depict a flowchart showing an exemplary method for applying a coordinated media effect according to a coordinated activity protocol;

FIG. 5A is a block diagram providing an overview of a system including an exemplary centralized communications service;

DETAILED DESCRIPTION

Figure 1A:
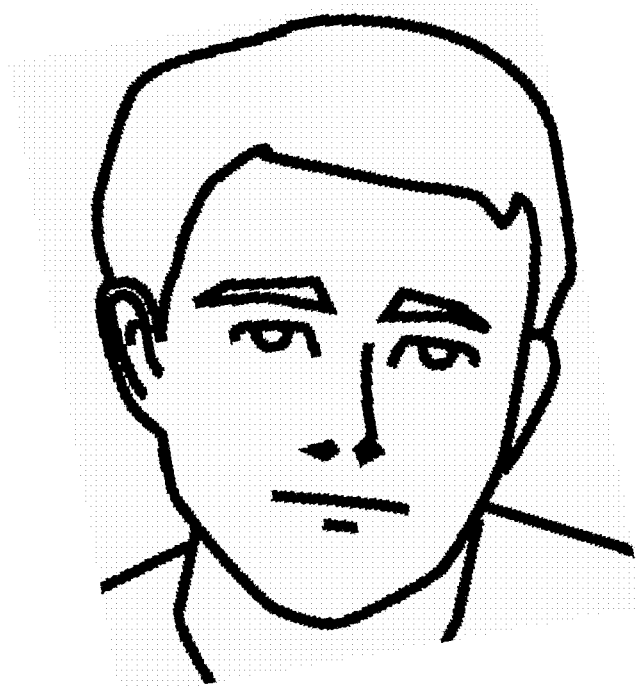
FIG. 1A depicts an exemplary facial overlay to be applied to a face of a user.

As noted above, media effects have previously been applied in a relatively simple manner by centralizing most activity at the device belonging to the user that is applying the media effect. It would be desirable to implement more complex media effects that affect multiple users. For example, when participating in a video call, one user might make a throwing action, causing a ball to appear in their hand and then fly off the screen; subsequently, the ball might appear on the video feed of another user, who could mimic catching the ball.

Such a scenario is, however, not straightforward to implement. Whereas a single-user media effect can be handled, directly or indirectly, through action at the initiating user's device, coordinated media effects require that non-initiating user devices cooperate to apply the media effect (which may require that the non-initiating user devices have access to data required for the media effect, understand how to apply the media effect, and make changes to the non-initiating user's video stream, among other possibilities). However, there is not currently an efficient way to coordinate media effect application between initiating and non-initiating devices.

The present application describes a new protocol for synchronizing interactive effects and experiences across multiple devices. This coordinated activity protocol allows effects to be initiated and coordinated on multiple devices via a real-time communication (RTC) channel. The protocol involves exchange messages to cooperatively initiate the effect, and (once initiated) exchanging generic data via application programming interface (API) calls. Accordingly, the system is both data-type and platform agnostic, allowing effects developers to define how data will be interpreted.

In some cases, higher-level services may be provided to exchange data of predefined types (e.g., for important common activities such as turn negotiations, turn yielding, scorekeeping, leadership elections, etc.).

The protocol may be used to synchronize effects in a video stream, coordinate non-video-centric experiences (e.g., communal video-watching, book reading, multiplayer games, single-player games with a viewing experience, short duration single-player games on a round-robin basis, photo album viewing/organizing), etc.

This brief summary is intended to serve as a non-limiting introduction to the concepts discussed in more detail below. However, before discussing further exemplary embodiments, a brief note on data privacy is first provided. A more detailed description of privacy settings and authentication will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided As an aid to understanding, a series of examples will first be presented before detailed descriptions of the underlying implementations are described. It is noted that these examples are intended to be illustrative only and that the present invention is not limited to the embodiments shown.

Media Effects

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

FIG. 1A depicts an exemplary media effect in the form of a facial overlay 100 to be applied to a face of a user. The facial overlay 100 may be made up of one or more images of a face to be mapped to, and overlaid onto, the face of a user (e.g., in a video communication). In the case of a single facial image making up the overlay, it may be advantageous to utilize a front-facing image (e.g., an image looking as directly as possible into the camera). A user onto whom the overlay 100 is mapped is likely to be interacting with a camera, e.g. in a video call, and hence is likely to be looking directly at the camera. Thus, by using a front-facing image for the overlay, the perspective of the overlay is consistent with the perspective of the user. The perspective of the overlay 100 may nonetheless vary by application; in situations in which the user is expected to be interacting with the camera from a different angle (e.g., from the side), a suitable default overlay perspective may be used.

In the case of multiple images making up the overlay, it may be advantageous to include a front-facing overlay, as well as images taken from other perspectives that are likely to be adopted by the user. For example, during a video recording the user may look slightly to the left or the right, may nod their head, or may turn to the side. Including overlay images from each of these perspectives may allow for a more seamless effect. In some cases, when a user transitions from one perspective (e.g., front-facing) to another (e.g., side-facing), overlay information from two or more images may be extrapolated in order to generate perspectives in between these two extremes. For example, if a front-facing overlay image is available and a side-facing overlay image is available, data from both of these overlays may be used to extrapolate appropriate overlay information for mapping the overlay 100 to the user's face when the face is at, e.g., a forty-five degree angle.

Alternatively or in addition, the overlay 100 may represent a three-dimensional model that may be mapped to the user's head. This embodiment has the advantage of allowing for a more seamless overlay even as the user's face moves between many different angles. On the other hand, generating such a model typically requires more a priori work than mapping an image to a face.

Figure 1B:
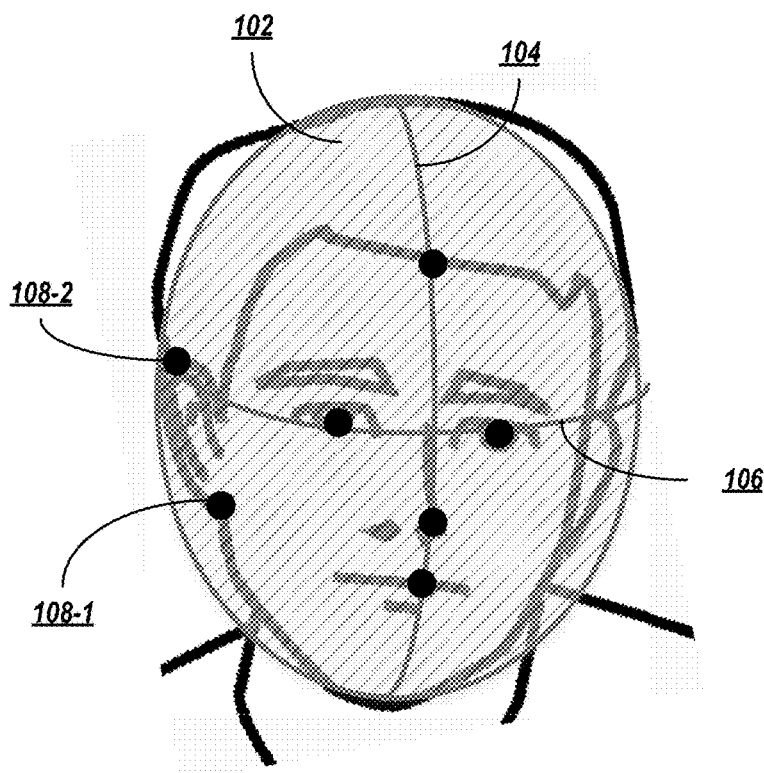
FIG. 1B depicts the facial overlay of FIG. 1A with particular facial features pinpointed.

In addition to the facial image(s) or model(s), the facial overlay 100 may include metadata for facilitating positioning, scaling, etc. the facial overlay 100 onto a video including the face of a user. For example, FIG. 1B depicts several such examples of metadata.

The metadata may include an oval or other shape 102 substantially corresponding to the shape of the face in the overlay 100. A similar shape may be dynamically generated on the face of the user to whom the overlay is to be applied. By matching the shape 102 to the shape overlaid onto the user's face, the overlay 100 may be more readily applied to the user's face in real time. The shape may include axes 104, 106 extending through the center of the face and/or aligning with certain features (e.g., the user's eyes, nose, etc.) The axes may be aligned in real time to similar axes dynamically generated on the face of the user.

The metadata may further include points of reference 108-$i$ on the facial overlay 100. The points of reference 108-$i$ may represent locations of certain features (e.g., top of the ear 108-2, bottom of the ear 108-1, tip of nose, center or edges of mouth, center of brow line, center of eyes etc.) which may be aligned with corresponding points on the face of the user.

Any or all of the metadata may be used to position the overlay on the face of the user in a video, to stretch or scale the overlay 100 or portions of the overlay 100 so that it fits on the user's face (although limits may be enforced to avoid overly distorting the overlay 100), or to extrapolate information to allow the overlay 100 to be applied to the user's face at different angles.

The metadata may be generated automatically (e.g., by algorithmically analyzing the image(s) making up the overlay 100), and/or may be applied manually by a user or administrator.

Figure 1C:
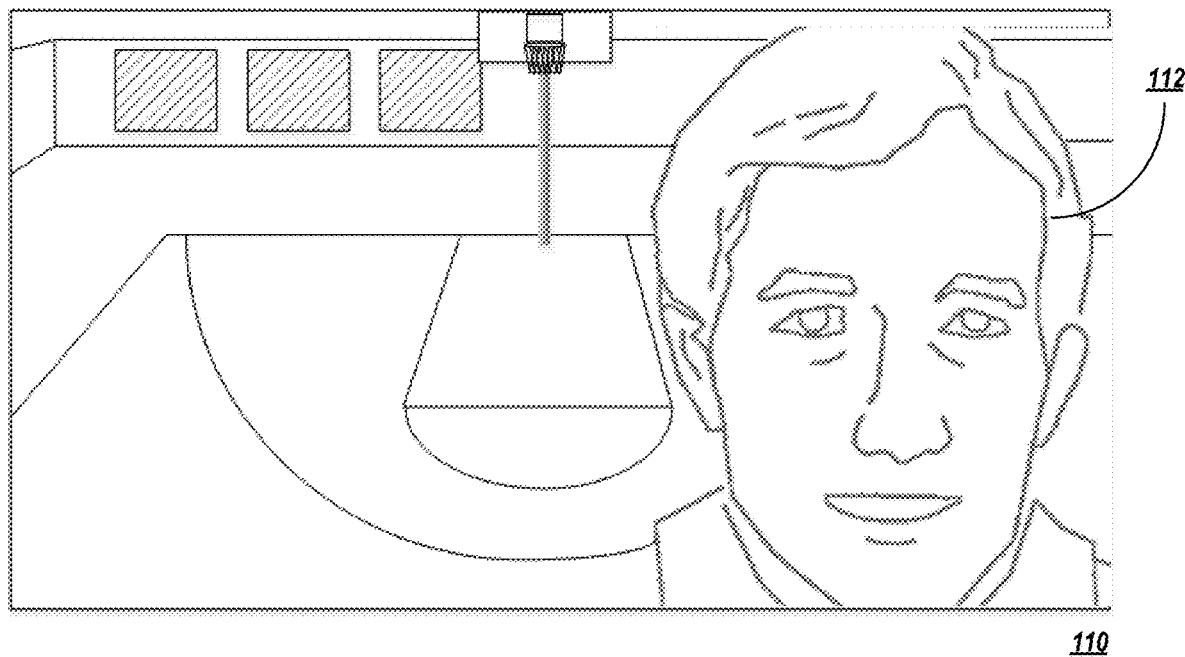
FIG. 1C depicts an exemplary video interface including a face of a user.
Figure 1D:
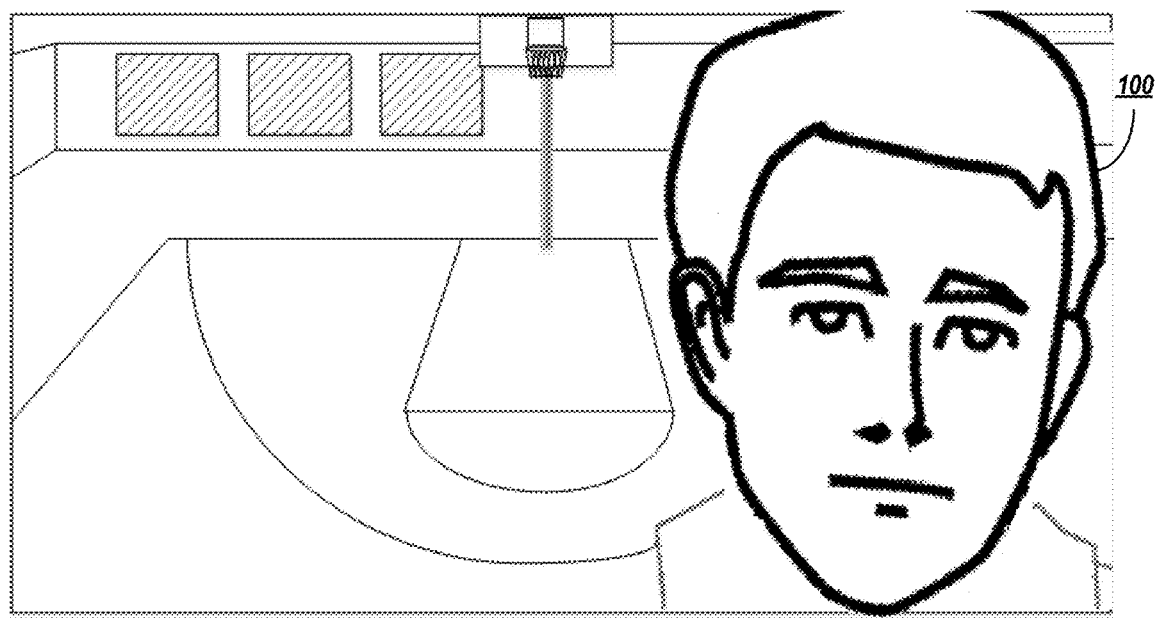
FIG. 1D depicts the facial overlay of FIG. 1A applied to the video interface of FIG. 1C.

The overlay 100 may be applied over the face 112 of a user in a video, such as a prerecorded video, real-time video communication, etc., as shown in FIGS. 1C-1D. FIG. 1C depicts an example of a video interface 110 in which a user's face 112 appears. FIG. 1D depicts the video interface 110 with the overlay 100 overlaid on the user's face.

Media effects are not limited to facial overlays, but may represent any suitable audio or visual data which may be applied to a video or interface to modify the video or interface. A media effect may be applied to the video of the user initiating the video effect. The media effect may be applied directly by the user (e.g., by pressing an on-screen button or otherwise issuing a command to apply the media effect), or indirectly (e.g., by detecting an emotion of the user and applying a corresponding media effect automatically, among other possibilities).

Figure 1E:
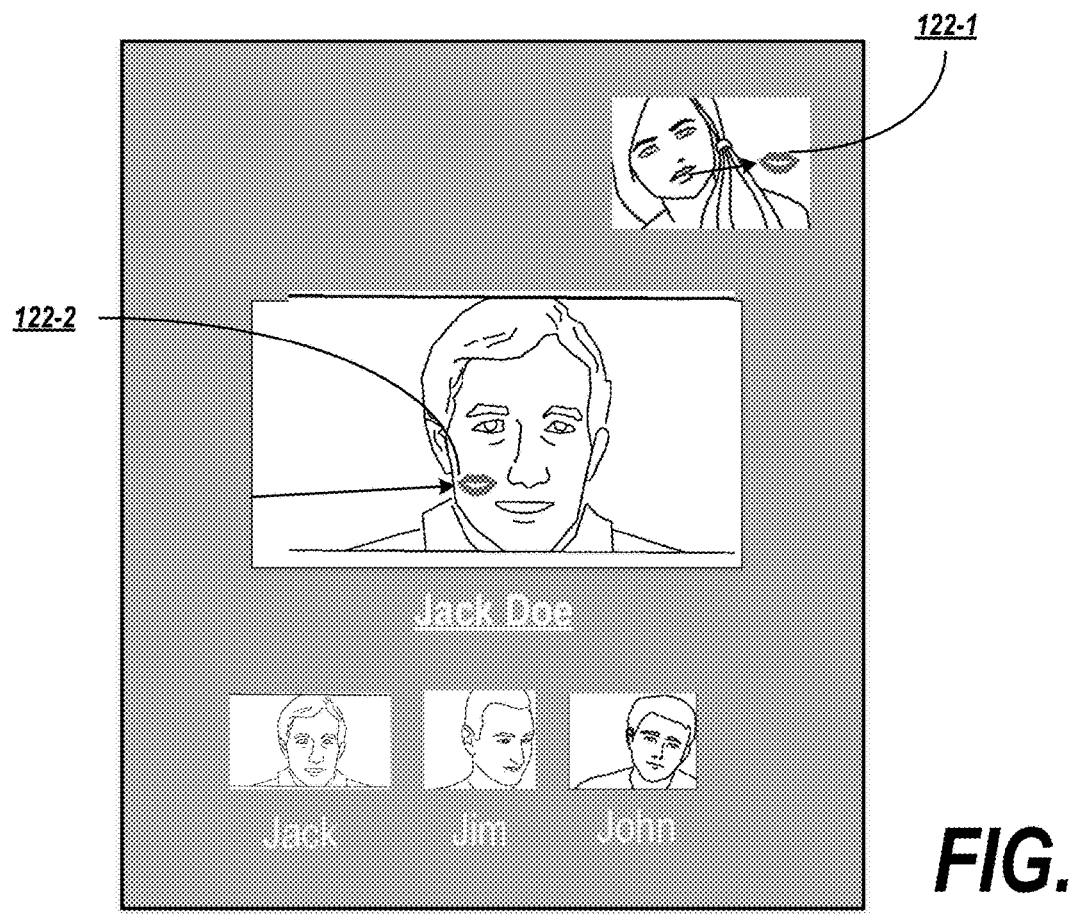
FIG. 1E depicts an exemplary interface for karaoke performance in accordance with an exemplary embodiment.

In some embodiments, a media effect may apply to a different participant than the participant who applied the media effect, or may apply to multiple users in a coordinated manner. FIG. 1E depicts an example of an interface in which a media effect is applied to multiple users.

In this case, the system detected an emotional state (e.g., a romantic emotional state) associated with a first participant (Jill) directed to a second participant (Jack). The system therefore applies a romantic media effect to both Jill's and Jack's video streams. In this case, an animated kissing media effect 122-1 appears in Jill's display, initially centered on Jill's mouth. The effect 122-1 appears to fly to the edge of Jill's screen and disappears. It reappears as a media effect 122-2 on Jack's display and flies to Jack's cheek. Each participant in the communication is able to see this coordinated media effect. Other examples may include animating an angry user's face as a dragon and showing the user breathing fire on another user, throwing snowballs, etc.

The multi-user media effect may be applied to the original (selecting) user for whom the emotional state was detected and at least one other user. The other user may be, for example, the currently-active user (e.g., the user that is currently speaking or otherwise considered to be most relevant), another user having the same emotional state, a user associated with a portion of the display at which the original user is currently looking (e.g., if the user is staring at another user's video stream and feeling an emotion that triggers a multi-user media effect, the media effect may be targeted at the other user's video stream), or a selected other user.

If the same emotion was detected for multiple users, the same or related media effects may be applied to the users. Alternatively, different media effects associated with the detected emotion may be applied. On the other hand, if different emotional states were detected for different users, different media effects (each associated with one of the detected emotional states) may be applied to the different users.

In some embodiments, the media effects may be automatically applied directly. In other cases, multiple candidate media effects may be identified, and a set of recommended media effects may be automatically presented.

Media effects are not limited to animations or graphical data. For example, an audio effect may be applied to the video stream. The audio effect may include, for instance, adding audio to the stream (e.g., playing an audio track, such as a laugh track or an applause track), modifying audio in the steam (e.g., changing a property of a user's voice, such as the pitch, volume, etc. of the voice), playing a beat that matches a song in the audio stream, etc.

Furthermore, the techniques described herein are not limited to media effects in the form of audiovisual data that modifies a video. In some embodiments, messages may be exchanged according to the coordinated activity protocol to modify a state of any coordinated activity (e.g., single- or multi-player games, coordinated viewing experiences, etc.). The modification may include a graphical or audible overlay applied to visual or audible data, or may change a state of the coordinated activity (e.g., electing a leader device for purposes of conflict resolution in a multiplayer game, passing a turn in a game, issuing commands to an interactive book, video, or photo album, etc.).

In general, a coordinated effect may be an effect that modifies data associated with a coordinated activity and/or a state of the coordinated activity, where the modification requires cooperation by a device that did not initiate the effect. Coordinated effects may include media effects as applied to video data, as well as other types of effects.

An exemplary configuration for a client/server environment for applying a coordinated effect is next described with reference to FIG. 2A.

Exemplary System Configuration and Data Structures

Figure 2A:
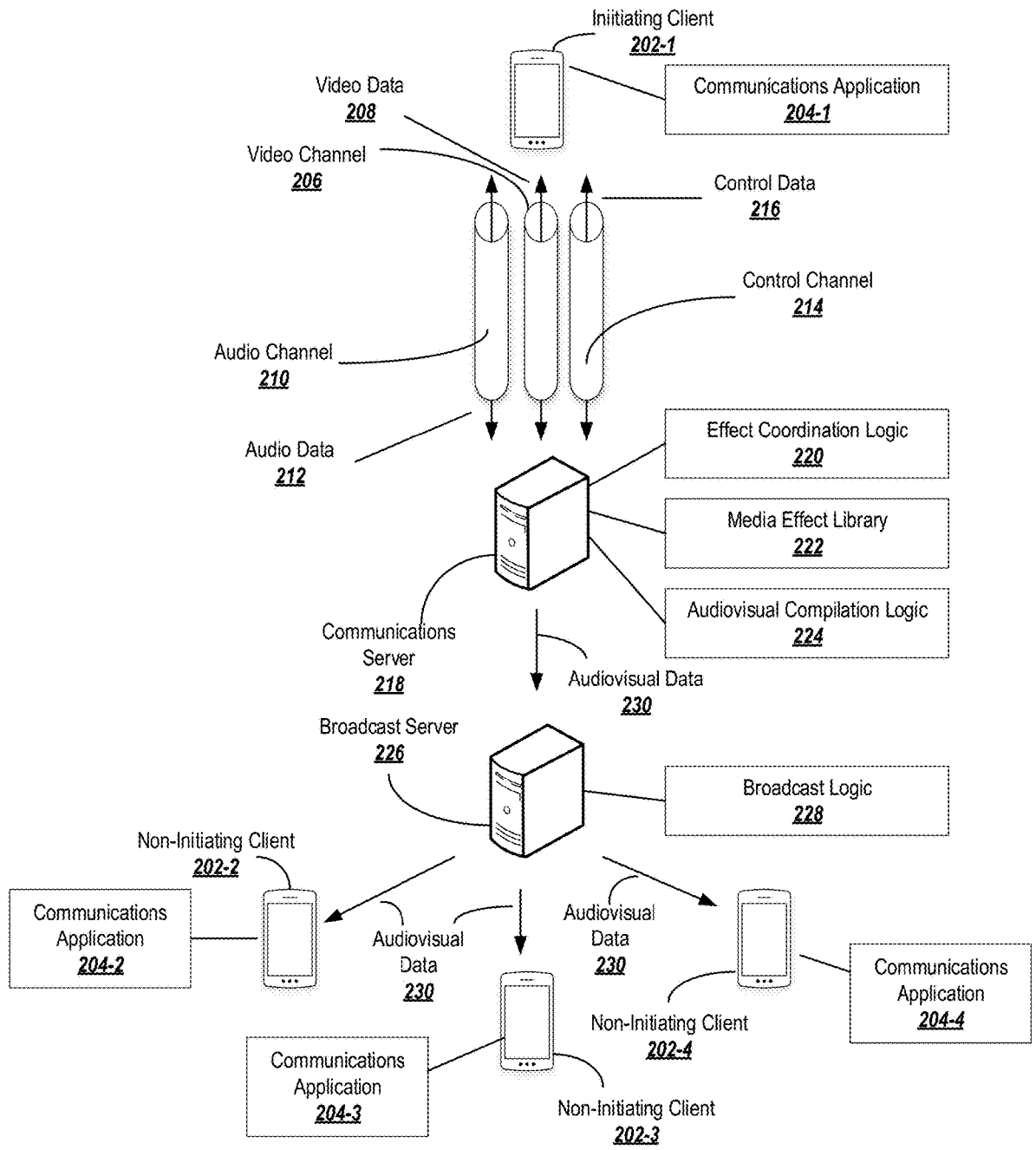
FIG. 2A is a block diagram depicting an exemplary client/server environment suitable for use with exemplary embodiments.

FIG. 2A depicts an exemplary system for applying coordinated effects. Coordinated effects may be applied automatically, manually, or a combination of both.

The system may facilitate a video communication, which may be (e.g.) a one-to-one, one-to-many, or group communication. Alternatively or in addition, the system may facilitate another type of coordinated activity (e.g., games, interactive viewing experiences, etc.). An example will be described below with reference to applying a coordinated media effect to a video conversation; however, it is understood that the present application is not limited to this example.

An initiating client 202-1 may be a device associated with a first participant in a communication. The initiating client 202-1 may be, for example a mobile device (although the present invention is not limited to application by mobile devices) executing a communications application 404-1 for participating in a coordinated activity, such as a video communication for a video-based conference call, with one or more other participants. The initiating client 202-1 may be a device that initiates a coordinated effect to be applied at or by one or more non-initiating clients 202-2, 202-3, 204-4, etc.

The communications application 204-1 may cause information associated with the video communication to be transmitted to one or more servers that facilitate the communication. For example, the information may include video data 208 containing video frames associated with the communication, audio data 212 containing sound information to be synchronized with the graphical frames, and control data 216. The control data 216 may include various instructions, identifiers, metadata, etc. used to apply a coordinated effect that are associated with (e.g., synchronized to) the video data 208 and the audio data 212.

In some examples, the coordinated effects may be applied by the application 204-1. In others, the application 204-1 may define a frame into which third parties may insert media effects via appropriate commands (e.g., application programming interface commands) or references.

Each type of data may be transmitted in an associated channel. For example, the communications application 204-1, or another component of the client 202-1, may open a video channel 206, an audio channel 210, and a control channel 214 with the media effect server 218. The video channel 206 may carry only video data 208 in a video format. Thus, the media effect server 218 may treat any data received on the video channel 206 as data in a video format and may process the data appropriately. Similarly, the audio channel 210 may carry only audio data 212 in an audio format.

It is understood that the present invention is not limited to transmitting video data 208 and audio data 212 on video channels 206 and audio channels 210, respectively. For example, graphical data may be shared in a data channel in the case where the coordinated activity is the viewing of a photo album. In another example, game data may be shared in a data channel dedicated to carrying information about the state of the game. For a shared listening experience (e.g., multiple users listening to a music album or concert at the same time), the channels may include an audio channel 210 but no video channel 206. In each case, the control channel 414 may be a real-time channel that is separate and distinct from the data channels.

The control channel 214 may transmit generic data that is not necessarily in a predetermined format, or may transmit control instructions in a specified control format. For example, the control channel 214 may carry an instruction to analyze the video data 208 and/or audio data 212, or may carry an instruction to apply a coordinated effect. The control channel 214 may be, for example, a Web Real Time Communications (WebRTC) channel.

The video channel 206, audio channel 210, and control channel may carry information in both directions. Thus, for example, the video channel 206 and audio channel 210 may carry data for display/playback on the initiating client 202-1 (e.g., data relating to the video streams of one or more non-initiating clients 202-2, 2-3, 202-4). The control channel 214 may carry recommendations from the media effect server 218, one or more identified emotional states, other instructions, etc.

The communications server 218 may be configured to coordinate the application of media effects between one or more initiating clients 202-1 and one or more non-initiating clients 202-2, 202-3, 202-4, etc by applying effect coordination logic 220. The communications server 218 may also store a coordinated effect library (not shown), which includes data relating to a number of available coordinated effects. The coordinated effects may be identified by an identifier, and the coordinated effect library may optionally mirror a coordinated effect library stored locally at the client devices 202. Alternatively or in addition, the library stored at the communications server 218 (or split between multiple communications servers 218) may be partially cached at the local client devices 202. In some cases, the local client devices may include thumbnail versions of the coordinated effects, allowing the effects to be selected in the communications application 204, but preserving storage on the client devices 202 by not including implementation details of the coordinated effects. Upon application of the coordinated effect, the respective client device 202 may request the implementation details from the communications server 218.

The communications server 218 may further include audiovisual compilation logic 224 for combining the video data 208, the audio data 212, and any applied coordinated effects. The audiovisual compilation logic 224 may include logic for synchronizing the audio data 212 with the video data 208, and further for synchronizing the coordinated effects with the combined audio/video data (or with the audio data 212 or video data 208 individually).

Once combined, the resultant audiovisual data 230 may optionally be transmitted from the communications server 218 to a broadcast server 226. The broadcast server 226 may include broadcast logic 228 that identifies one or more recipient clients 202-2, 202-3, 202-4 associated with the video communication. The broadcast server 226 may transmit the audiovisual data 230, which includes the audio data 212, the video data 208, and the applied coordinated effects, to each of the recipient clients 202-2, 202-3, 202-4.

In some cases, the audiovisual data 230 may be broadcast to all recipients 202-2, 202-3, 202-4, but messages related to coordinated effects may be transmitted on respective control channels 206 to non-initiating clients 202-i whose coordination is required to make the effect work. For instance, in the example shown in FIG. 1E, the media effect may be initiated by Jill's device and may require coordination with Jack's device (in order to apply the corresponding kissing animation on Jack's video in appropriate coordination with Jill's video). Although the video data may continue to be broadcast by the broadcast server 226 as the media effect is applied, the control data provided to and from each of the devices may vary. For example, Jill's device may transmit an initiation instruction on the control channel 214, which may be relayed to Jack's device (but not to the other devices receiving the audiovisual data 230). Jack's device may transmit acknowledgements, data, etc. to the communications server 218 on its own respective control channel 214 (not shown).

In some embodiments, the control data 216 may also be provided to some or all non-initiating clients 202-i.

As the media effect is coordinated between Jack's and Jill's devices, each device may transmit/receive control data 216 to/from the communications server 218 to allow the effect to be applied to their respective audio data 212 and/or video data 208 (or those effects may optionally be applied locally, by the respective client devices, in a coordinated manner). The resulting modified audiovisual data 230 may be broadcast by the broadcast server 226 to each participant in the conversation.

Although FIG. 2A depicts a particular example involving coordination between a client and a server, it is noted that the present invention is not limited to such embodiments. In other examples, multiple servers may be used, or no servers may be used. For instance, in a peer-to-peer implementation, the initiating client 202-1 may communicate directly with the non-initiating clients 202-2, 202-3, 202-4, without the aid of the intervening communications server 218 and/or broadcast server 226. In such an embodiment, the respective clients may implement the effect coordination logic 220, the media effect library 222, and/or the audiovisual compilation logic. In some embodiments, the clients 202-i may communicate in a peer-to-peer manner, but may be supported by one or more servers (e.g., a server storing the media effect library 222).

Figure 2B:
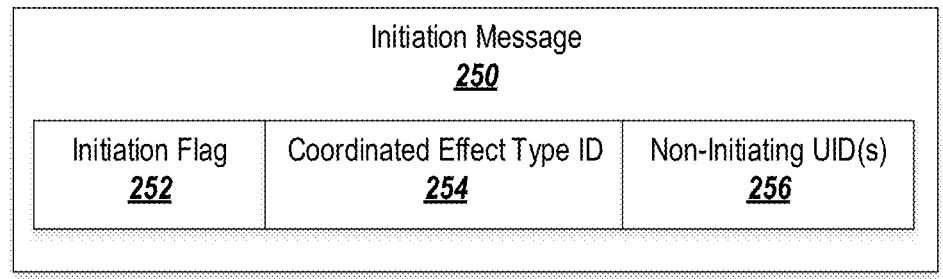
FIG. 2B depicts an exemplary data structure for a media effect initiation message.
Figure 2C:
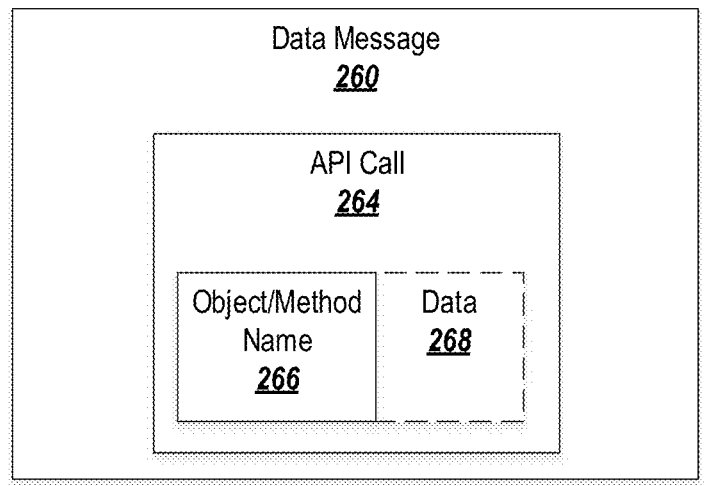
FIG. 2C depicts an exemplary data structure for a media effect data exchange message for exchanging generic data or data of a predefined type.

FIGS. 2B-2C depict examples of messages that may be exchanged to coordinate application of the media effects.

FIG. 2B depicts an initiation message 250 which may be transmitted by an initiating client device to start or initialize a coordinated effect at a non-initiating client device. The initiation message 250 may be received by the communications server over an RTC channel.

The initiation message 250 may include a flag 252 or other identifier in a header of the message 250 that identifies the message 250 as a coordinated effect initiation message. Accordingly, the communications server 218 may, upon receipt of the message 250, take appropriate steps to process the message 250 and request that one or more non-initiating clients start the coordinated effect. The flag 252 may be included, for example, in header data of the initiation message 250.

The initiation message 250 may further include a coordinated effect type identifier 254. The identifier 254 may specify a type of the coordinated effect (e.g., identifying the kissing effect, a synchronization effect, an application command effect, etc.). The identifier 254 may correspond to an identifier associated with the coordinated effect in the coordinated effect library stored at the communications server (see description in connection with FIG. 2A).

The message 250 may further specify one or more non-initiating user identifiers 256. These identifiers 256 may indicate which participants in the coordinated activity the media effect identified by the type identifier 254 should apply the media effect. The communications server may read the non-initiating user identifiers 256 and forward the initiation message 250 to appropriate devices on an RTC channel.

Once the media effect is initiated, the initiating user device and the non-initiating user devices may coordinate the application of the media effect by exchanging data. For this purpose, a data message 260 may be used, as shown for example in FIG. 2C.

Data may be exchanged for the coordinated effect via application programming interface (API) calls. For example, the application on the user devices may be associated with an application-level platform that supports API calls to generate or modify coordinated effects. One example of such a platform is the AR Studio by Facebook, Inc. of Menlo Park, Calif.

However, the coordinated activity protocol that coordinates a coordinated effect need not understand the implementation details of the coordinated effect. By allowing for the effect to be coordinated via API calls that exchange generic data (i.e., data that is not in a format that is predefined and/or recognized by the coordinated activity protocol that defines the format of the initiation message 250 and the data message 260), the protocol may be applied in a manner that is agnostic to the devices on which the effects operate, as well as to the effects themselves and the platforms that support those effects.

Accordingly, the coordinated activity protocol supports the coordination of various effects by allowing the effects and/or the devices running the effects to exchange data with each other, while allowing the application and/or platform supporting the effects to determine how that data will be interpreted. Thus, the protocol is readily extensible to new effects, platforms, and devices.

The data message 260 may include an API call 264 recognizable by the platform and/or application supporting the coordinated effect. The API call 264 may include an object or method name 266, identifying the coordinated effect to which the message 260 applies. When a coordinated effect is initiated in response to the initiation message 250, the platform may assign an object name or identifier to the effect. The name or identifier may be specified as part of the initiation message 250, may be specified by the initiating device separately from the initiation message 250, or may be assigned by the non-initiating device in response to the initiation message 250 and returned as part of the acknowledgement of the initiation message 250, among other possibilities. This name or identifier may be used in the API call 264 to ensure that the message 260 is applied to the appropriate effect.

In some cases, the API call 264 may specify a method name. The method name may indicate how the coordinated effect is to be applied or modified. For example, the API call 264 may be a call to a "stop" method of a shared video viewing experience. Applying the stop method may cause the playback of the video to be stopped on the initiating and non-initiating devices.

The coordinated activity protocol may support (and may expose) different methods of communication. In one example, the protocol may support a reliable mode of communication and a non-reliable mode of communication. The application may specify whether the message 260 should be transmitted in the reliable mode or the unreliable mode by, e.g., calling different APIs to deliver the message in a reliable or unreliable manner. For example, the system may make an unreliable "sendData( )" API call, or a reliable "sendData Transacted( )" API call.

When transmitted in the reliable mode, the coordinated activity protocol may guarantee that the data message 260 is received by a target device. For instance, the communications server may, upon forwarding a data message 260, wait for the recipient device to send an acknowledgement. If no such acknowledgement is received in a predetermined amount of time, the server may retransmit the data message 260 until receipt is acknowledged (or until a predetermined number of attempts or a predetermined amount of time elapses, after which an the sender may be informed that transmission has failed). The reliable mode may be useful for commands and critical data that affect a state of the coordinated activity (e.g., video start/stop/pause/play/synch commands, turn negotiations in games, turn yielding, score-keeping, etc.). The message may be transmitted with an identifier to ensure that, if a duplicate copy of the message is received, the message data is not processed more than once. An example of a reliable mode of communication is implemented by the user datagram protocol (UDP), although other suitable examples exist.

When transmitted in the unreliable mode, the coordinated activity protocol may not provide delivery guarantees for the data message 260. The communications server may send the message 260 to its intended recipients once and may not require an acknowledgement of receipt of the message. The unreliable mode may be useful for, e.g., streams of data in which the loss of one or a few data points may not necessarily degrade the performance of the coordinated effect. For instance, in the example described below regarding FIG. 1A, the location of Jill's mouth may be transmitted at regular intervals to allow for the coordination of the kissing effect. However, the loss of one or a few of these data points may not be catastrophic; the system may interpolate between data points that are received. By allowing these data points to be transmitted in the unreliable mode, the effect may conserve processing resource at the initiating and non-initiating sides, and may further conserve network resources (since messages do not need to be retransmitted and acknowledgements do not need to be sent).

In some embodiments, initiation messages 250 are always transmitted in the reliable mode, thus allowing the effect to be initiated in a guaranteed manner. In other embodiments, the protocol may allow the initiation messages 250 to provide a reliability flag 262, thus potentially allowing the initiation messages 250 to be transmitted in the unreliable mode. This may be used, for example, when the application applying the effect itself guarantees delivery (e.g., by communicating directly between the application at the initiating and non-initiating side).

In some embodiments, application of the coordinated effect may require data separately from, or in addition to, the method name. Accordingly, the API call 264 may optionally specify data 268 useable by the media effect (e.g., coordinates, synchronization data, etc.).

For instance, in the example from FIG. 1E, the kissing effect may appear to fly off of Jill's screen to the left, right, top, or bottom, depending on which side of the screen is closest to Jill's mouth and/or the current layout of the videoconferencing user interface (e.g., whether Jack's video frame is appearing to Jill's left, right, top, or bottom). The media effect may disappear from a given location on Jill's video and reappear at a corresponding nearby location on Jack's video. Thus, the data 268 may include a location of Jill's mouth as identified by facial recognition logic, so that when the kissing animation appears on Jack's video, it appears to be originating from a point as close as possible to where it disappeared in Jill's video.

In another example, the path of the kissing animation may depend on both the location of Jill's mouth and of Jack's cheek, appearing to take the shortest path between these locations as viewed in a videoconferencing user interface. Thus, Jill's device may transmit data 268 identifying the location of Jill's mouth, and Jack's device may transmit data 268 identifying the location of Jack's cheek. The path of the kissing animation may be determined independently by Jack's and Jill's respective videoconferencing applications, or may be determined by the intermediate communications server.

The data 268 may further include timing information, allowing the effect to simultaneously disappear from Jill's video and reappear on Jack's video.

In other examples, the data 268 may include timing data for synchronization purposes, information relating to the game state of a single- or multi-player game, application-specific commands, or any other type of data usable to apply a coordinated effect.

The data 268 may be in a generic format not predetermined by the coordinated activity protocol. Alternatively, the coordinated activity protocol may directly support a number of high-level services (e.g., turn negotiations in a game, leadership elections, etc.) that are commonly used for coordinated effects from different providers. In this case, the data 268 may be formatted in a predetermined format associated with the particular service to be applied. When the server or a receiving client identifies that the data 268 is in the predetermined format associated with a particular service, the system may invoke the service while specifying the data 268 to the service to provide the service's functionality to the effect.

In some cases, the data 268 may be expressly provided in the message 260, and the data may be pushed to the receiving client device. As an alternative, the field 268 may specify a location at which the data is stored, and the receiving client device may pull the data from the location upon receipt of the message 260 (or at a later time, such as on an as-needed basis).

Data Flow and Exemplary Methods

Figure 3A:
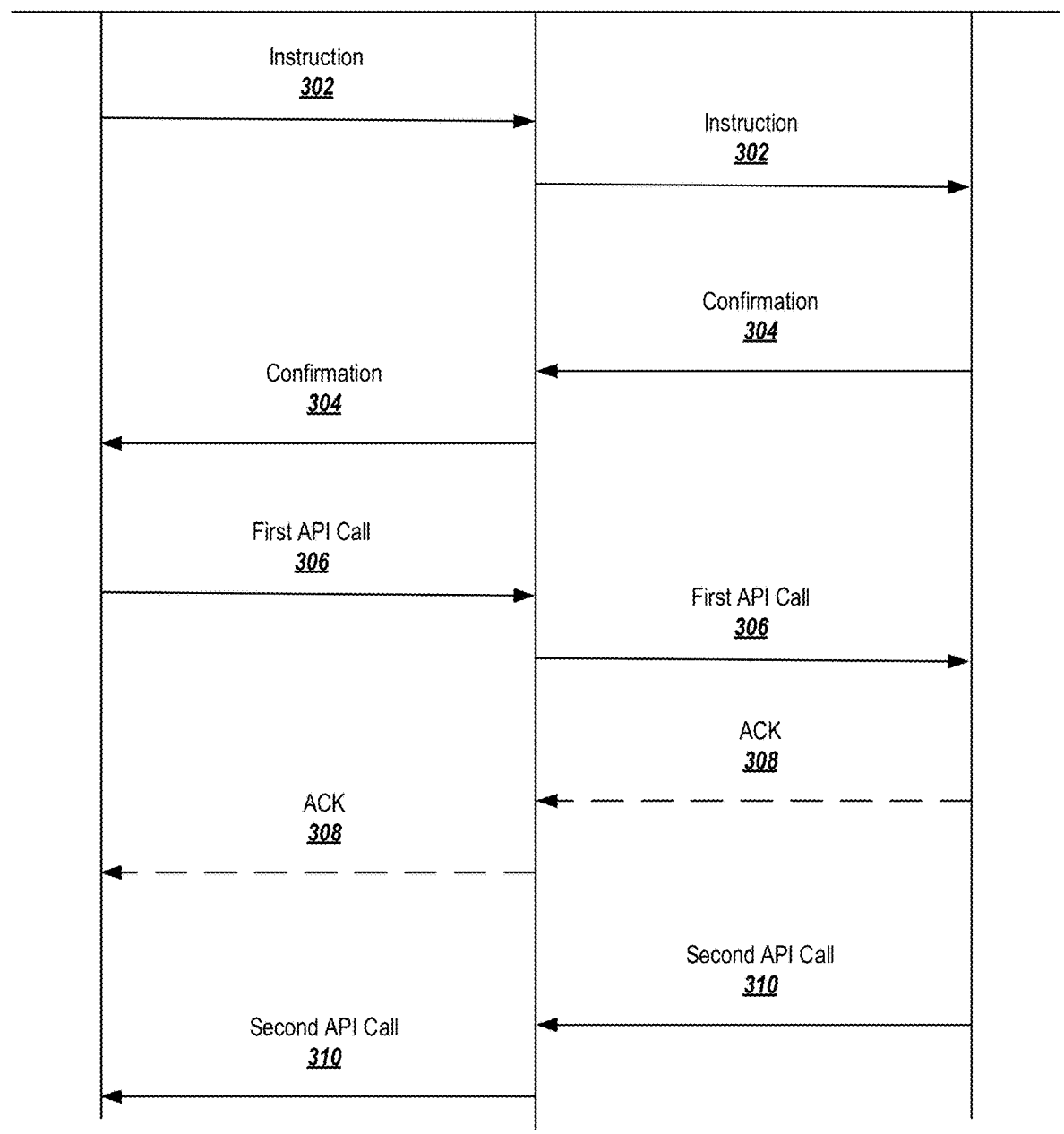
FIGS. 3A-3C are data flow diagrams depicting exemplary information exchange in a client/server environment.
Figure 3B:
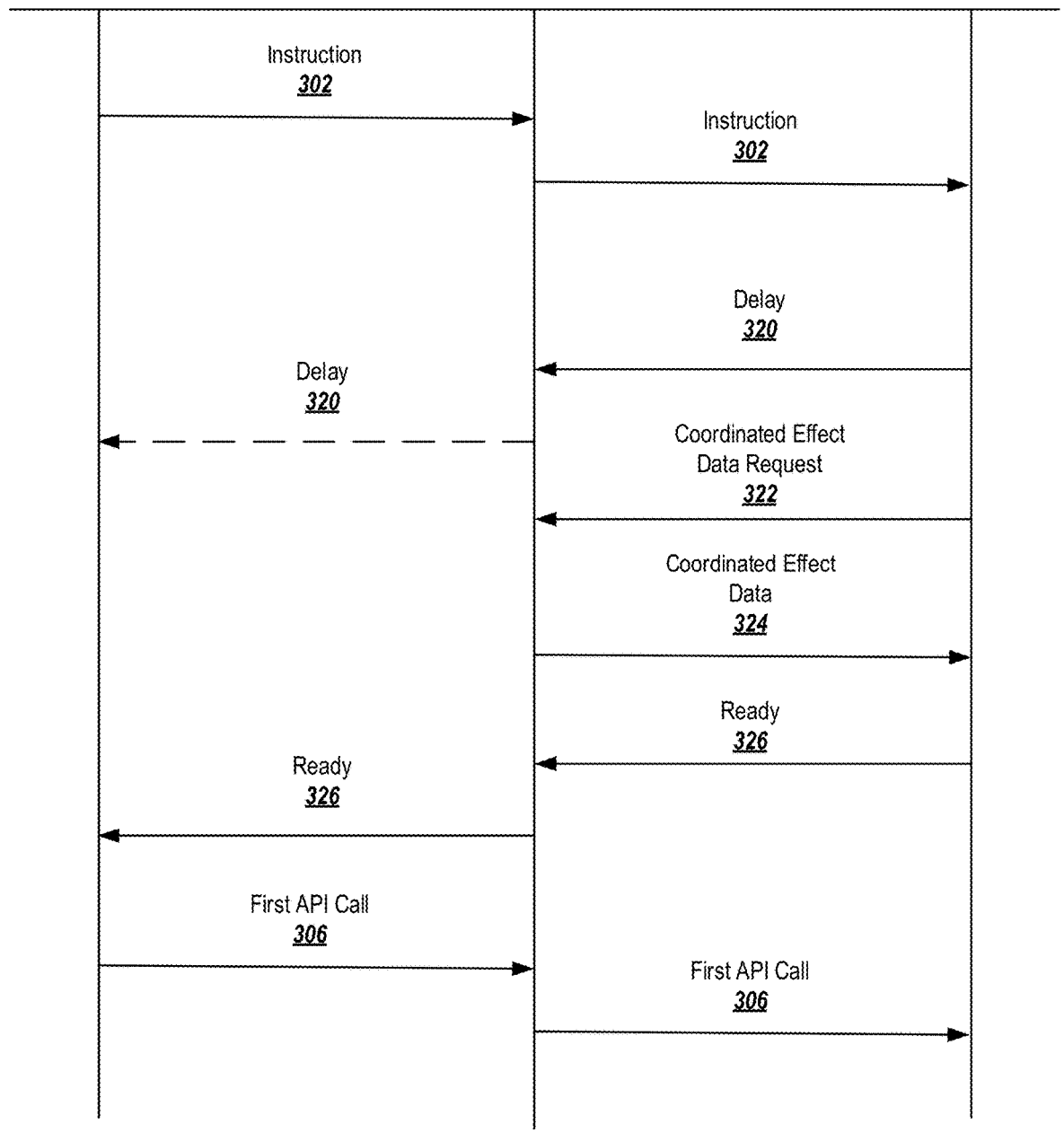
Figure 3C:
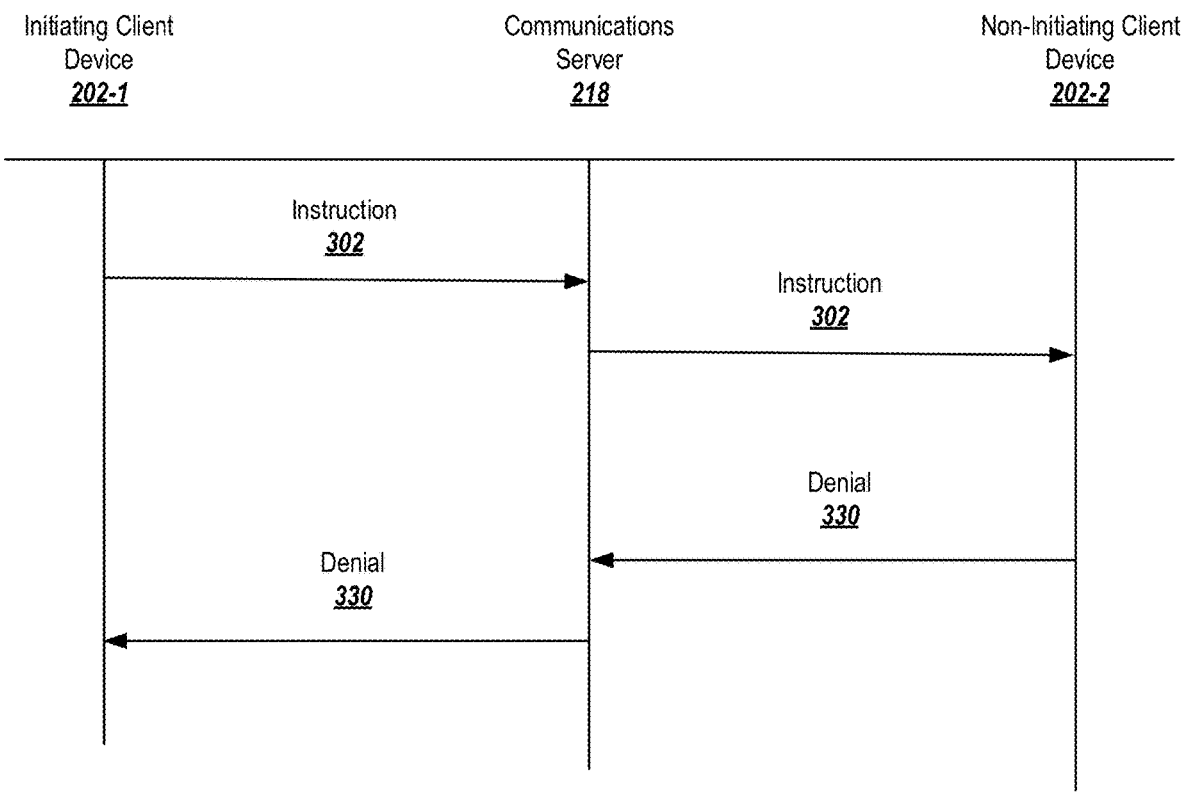

FIGS. 3A-C depict an exemplary data flow diagram depicting information exchange among various devices, such as those depicted in FIG. 2A, in various effect application scenarios.

As shown in FIG. 3A, an initiating client device 202-1 may transmit an instruction 302 to initialize or start a coordinated activity by a non-initiating client device 202-2. The instruction 302 may be in the form of an initiation message 250, such as the one depicted in FIG. 2B. The instruction 302 may be generated by an application of the initiating client device 202-1 in response to determining that a coordinated effect should be applied. The determination may result from a manual application of a coordinated effect by a user in an interface (e.g., selecting the coordinated effect and instructing the application to apply it), based on an automatic application of the coordinated effect when the application detects that certain conditions apply, etc.

Upon receiving the instruction 302, the communications server may identify one or more non-initiating user devices to which the instruction 302 is directed (e.g., based on the UID field 256 in the initiation message 250) and may forward the instruction to the identified devices.

Upon receipt, the non-initiating client device 202-2 may check to determine whether it is possible to apply the coordinated effect (e.g., by determining whether the local device has cached logic that is up-to-date for the coordinated effect). Optionally, the non-initiating client device may display a prompt allowing the device's user to authorize or cancel application of the coordinated effect.

Assuming that the non-initiating client device 202-2 determines that the effect can be applied, the non-initiating client device 202-2 may transmit a confirmation 304 back to the communications server 218. The communications server 218 may relay the confirmation to the initiating client device 202-1 that initially sent the instruction 302.

If more than one non-initiating client device is identified, the communications server may refrain from transmitting the confirmation 304 to the initiating client device 202-1 until all of the non-initiating client devices have acknowledged their readiness to start the coordinated effect. The communications server 218 may optionally signal the non-initiating client devices when all of the parties to the coordinated effect have checked in as ready.

The non-initiating client device 202-2 may instantiate, initialize, or start the coordinated effect immediately upon receipt of the instruction 302. Alternatively, each non-initiating client device 202-2 may signal its willingness to instantiate, initialize, or start the coordinated effect, but may wait to do so until all impacted non-initiating client devices have checked in as ready. In some embodiments, the coordinated effect may be delayed by some predetermined or user-specifiable amount of time, may be applied upon the occurrence of a trigger condition, or may be applied when a subsequent message (such as the first API call 306) is received, among other possibilities.

Once the initiating client device 202-1 has received the confirmation 304, the coordinated effect is ready to be applied. The initiating client device 202-1 and the non-initiating client device 202-2 may exchange data through API calls 306, 310 (e.g., via the data messages 260 exchanged via the communications server 218). If the API call 306, 310 is transmitted in a reliable mode, the device receiving the API call 306, 310 may respond to the call with an acknowledgement 308. The server 218 may use the acknowledgements 308 to determine whether to retransmit the API call 306, 308. Optionally, when an acknowledgement is received, the server 218 may relay the acknowledgement back to the device that originated the API call 306, 310.

FIG. 3B depicts an example in which the non-initiating device is willing to apply the coordinated effect, but does not have all required information to apply the effect (e.g., the non-initiating device does not have a copy of the logic for implementing the coordinated effect locally cached). In this case, the non-initiating client device 202-2 transmits a delay request 320 in response to receiving the instruction 302. The server 218 may optionally inform the initiating client 202-1 that the delay has been requested; alternatively, the server 218 may simply wait until the delay has been resolved before reporting back to the initiating client 202-1 regarding the status of the coordinated effect.

After transmitting the delay request 320, the non-initiating client 202-2 may transmit a request 322 for any missing media effect data. Alternatively, the request may be part of the delay request 320, or may be inferred from the server 218 by the existence of the delay request 320. In response, the server 218 may retrieve the missing data specified in the request 322 (or all data associated with the coordinated effect) from its local coordinated effect library or from a remote location. The server 218 may then transmit the coordinated effect data 324 to the non-initiating client 202-2. Alternatively, the server 218 may transmit a location from which the data can be retrieved, and the non-initiating client 202-2 may retrieve the data from the specified location.

After the coordinated effect data is applied, the non-initiating client 202-2 may transmit an indication 326 that the non-initiating client 202-2 is ready to (or already did) initiate the coordinated effect. The server 218 may transmit the indication 326 to the initiating client 202-1, after which the initiating client 202-1 and non-initiating client 202-2 may exchange data as described above.

FIG. 3C depicts an example in which the non-initiating device declines to apply the coordinated effect. The denial may be for a number of reasons, such as: if the non-initiating client 202-2 does not have data that is necessary for applying the coordinated effect and cannot acquire the data; if a user of the non-initiating device 202-2 expressly cancels application of the coordinated effect or has specified a preference indicating that the coordinated effect should not be applied; if the application 204-2 on the non-initiating client 202-2 does not support application of the coordinated effect; the non-initiating client does not have sufficient resources available to apply the coordinated effect; etc. If application of the coordinated effect is denied at the non-initiating client 202-2, a denial message 330 may be transmitted to the server 218 and relayed to the initiating client 202-1. In response, the initiating client 202-1 may cancel application of the coordinated effect.

If the coordinated effect was to be applied at multiple non-initiating clients, then denial of the effect at one or more of the clients may or may not cause the effect to be canceled at all clients. In some embodiments, certain clients may be flagged as essential and others optional; cancellation at the optional clients will not cause the effect to be canceled at the remaining clients, although cancellation at the essential clients will. In other embodiments, the effect may be applied to any user that has not denied application of the effect. In still others, the effect may be applied unless a predetermined threshold number or proportion of clients deny application of the effect.

Figure 4A:
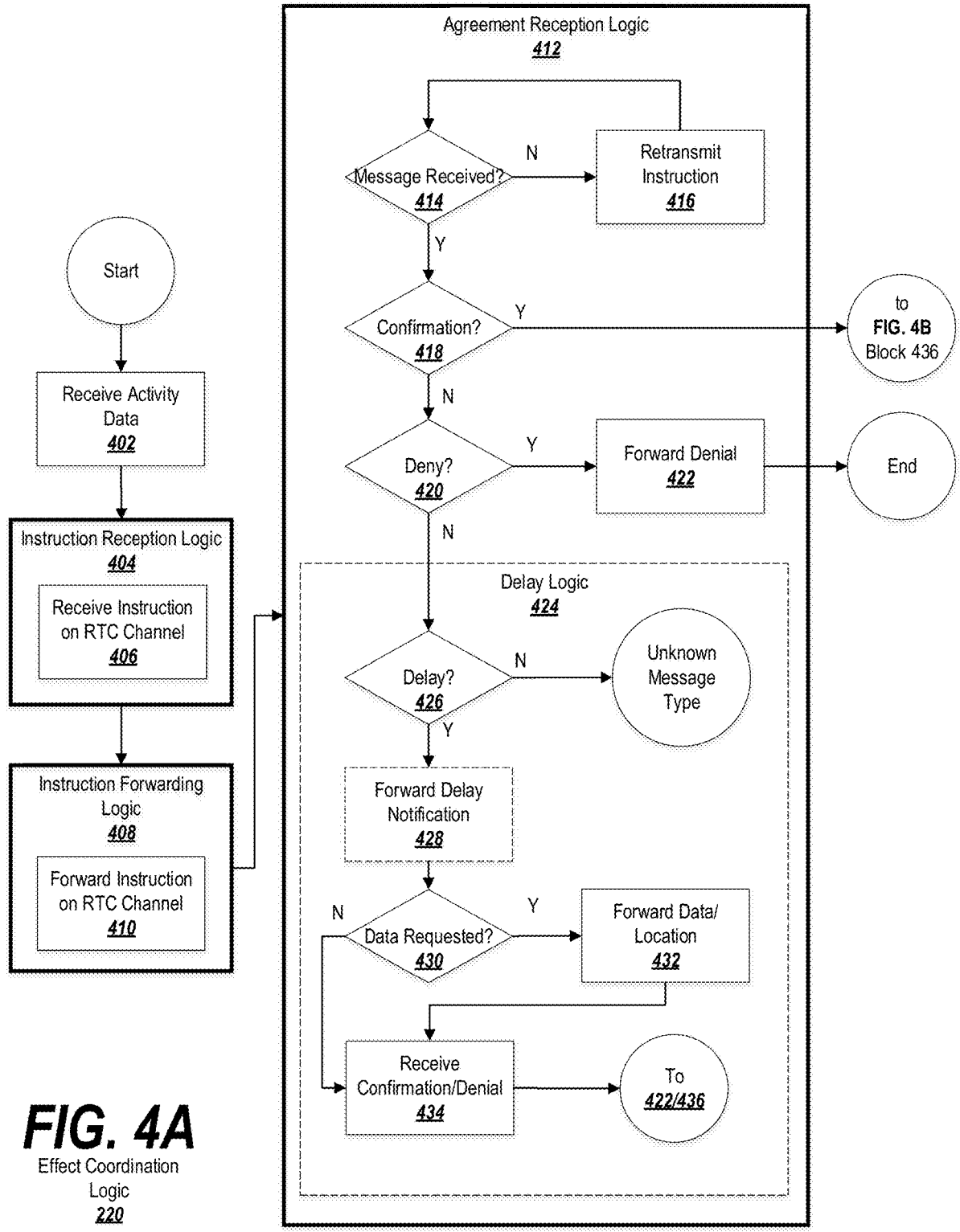

Next, exemplary logic 400 for applying the coordinated effect based on an image search are described in connection with FIGS. 4A-4B. FIGS. 4A-4B organize the logic block depicted into various groups of logics (e.g., instruction reception logic 404, instruction forwarding logic 408, etc.). In some embodiments, these logic modules may be provided on a communications server 218, as shown in FIG. 2A, although it is understood that such a configuration is not required. All of the modules may be implemented in the same device, or may be distributed across any number of devices. Various combinations of modules may be employed on a given device, or the logic of an individual module may be performed by different devices.

Processing may begin at block 402, where the system receives data regarding a coordinated activity or interaction. For example, the data may include video data for a videoconference, game data for a multiplayer game, graphical data for displaying a photo album, data regarding the contents of a book for use in a shared reading experience, etc. The system may identify one or more client devices associated with the coordinated activity.

Processing may then be handed over to instruction reception logic 404. The instruction reception logic 404 may, at block 406, engage a network interface to receive an instruction. The network interface may listen on a real-time communication (RTC) channel for the instruction. The instruction may be in the form of an initiation message, as described in connection with FIG. 2B. The instruction may originate with an initiating client and may instruct the system to initiate a coordinated effect related to the activity referenced in block 402 on a non-initiating client.

Processing may then be handed over to instruction forwarding logic 408. The instruction forwarding logic 408 may, at block 410, engage the network interface to forward the instruction to the non-initiating client devices identified in the instruction via an RTC channel.

Processing then may be handed over to agreement reception logic 412. Optionally, the agreement reception logic 412 may guarantee delivery of the instruction to the non-initiating client(s) by, for example, retransmitting the instruction to respective clients until the clients acknowledge receipt of the instruction or transmit a response message (blocks 412-414).

In response to the instruction, the non-initiating client may respond with one of several different types of messages on its RTC channel. At block 418, the system may determine if the response is a confirmation that the coordinated effect has been, or will be, started at the non-initiating client. If the determination at block 418 is "yes," then processing may be handed off to agreement forwarding logic 436 (FIG. 4B).

If, on the other hand, the determination at block 418 is "no," then processing may proceed to block 420 and the system may determine if the message is a denial of the coordinated effect. If so, processing proceeds to block 422, where the system may forward the denial back to the initiating client, which may cancel the application of the coordinated effect or may apply the coordinated effect to a subset of non-initiating clients, as outlined above. Processing may then end.

If the determination at block 420 is "no," the system may proceed to block 426 and determine if the message is a delay request. If so, the system may (optionally) forward a notification of the delay request to the initiating client device at block 428. If the delay request or a subsequent message requests data relating to the coordinated effect (block 430), then at block 432 the system may either retrieve the relevant data from a local repository, or may identify a remote location where the data is held. The system may forward the data and/or location information to the requesting device on the RTC channel.

At block 434, the system may receive a confirmation or denial of the delayed request. If the message is a denial (e.g., the non-initiating client received the data at block 432 and determined that it did not have the necessary resources or a sufficiently up-to-date version of the application to run the coordinated effect), then processing may return to block 422 and the system may process the denial as described above. If the message is a confirmation that the effect has been, or will be, started, then processing may be handed off to the agreement forwarding logic 436 (FIG. 4B).

Blocks 426-434 may together make up delay logic 424.

Turning to FIG. 4B, agreement forwarding logic 436 may be operable, at block 438, to transmit a confirmation that the non-initiating client(s) have started, or are willing to start, the coordinated effect. The confirmation may be transmitted by a network interface on an RTC channel.

After the coordinated effect is started at both the initiating and non-initiating client devices, the devices may exchange information relevant to the coordinated effect. Accordingly, data reception logic 430 may, at block 432, receive a message containing an API call that is associated with data. The message may be, for example, a data message such as the one depicted in FIG. 2C. The message may be received by the network interface on the RTC channel associated with the sending device. The sending device may be the initiating client, or may be a non-initiating client. Processing may then be handed off to data forwarding logic 434.

At block 436, the data forwarding logic 434 may determine if the message received at block 432 invokes a high-level predefined service associated with the coordinated protocol (i.e., the protocol defining the effect coordination logic 220 and/or the format of the messages that are exchanged in the system). High-level services include common functionality that may be demanded by multiple different effects, and which are therefore implemented in a standardized way (typically on the communication sever 218) by the coordinated activity protocol. The forwarding logic 434 may analyze the message, including the API call, to determine if, e.g., the API call is associated with a service or if the message includes data in a predefined format associated with the service.

If the data forwarding logic 434 determines that the message invokes a high-level service, then at block 438 the system may optionally perform local actions associated with the service. For example, if the high-level service involves negotiating which client device will take the next turn in a multiplayer game or which device will play the next round in a single-player game, the system may select a player locally. If the service involves scorekeeping, the system may consult a state of the game that is stored locally (e.g., based on the activity data received at block 402) and update the score. Other examples of high-level services include yielding a turn (actively, through an express action by a user, or passively, by the occurrence of a condition), performing a leadership election (e.g. determining which client's game state will control in the case of contradictions between game states on different devices), etc.

In some cases, the system may not able to perform all actions related to a high-level service (e.g., when the system does not have all necessary information about the state of a coordinated activity). In this case, the system may flag the message as a high-level service to be implemented on the receiving client device, may request additional information from implicated client devices, and/or may generate instructions to be executed on the recipient client device in order to perform the service.

At block 440, the system may forward the API call and/or any instructions related to the service to the recipient of the message received at block 432.

At block 442, the system may determine if the message is to be sent in a reliable mode or an unreliable mode (e.g., as specified by a flag in the data message received at block 432). If the mode is an unreliable mode, the system may return to block 432 and await a new data message.

If the mode is a reliable mode, then the system may, at blocks 444-450, wait a predetermined amount of time and then determine if an acknowledgement of the message has been received. If so, the system may optionally forward the acknowledgement (block 448) to the sending client. If not, the system may retransmit the information original transmitted at block 440 (block 450), and then return to block 444 to wait another predetermined amount of time. If the loop at blocks 444-450 is repeated for more than a predetermined amount of time or a predetermined number of iterations, the system may determine that transmission has failed and may inform the sending client device of the failure of the message transmission.

Optionally, a running coordinated effect for which a data transmission fails may be shut down. Similarly, the system may receive a message from an initiating client device or a non-initiating client device indicating that the coordinated effect has finished (or otherwise terminated on the device, as might be the case if the coordinated effect fails during execution). In these cases, the system may perform shut-down and clean-up procedures, such as informing the other clients running the coordinated effect that the effect has terminated.

Communication System Overview

Figure 5B:
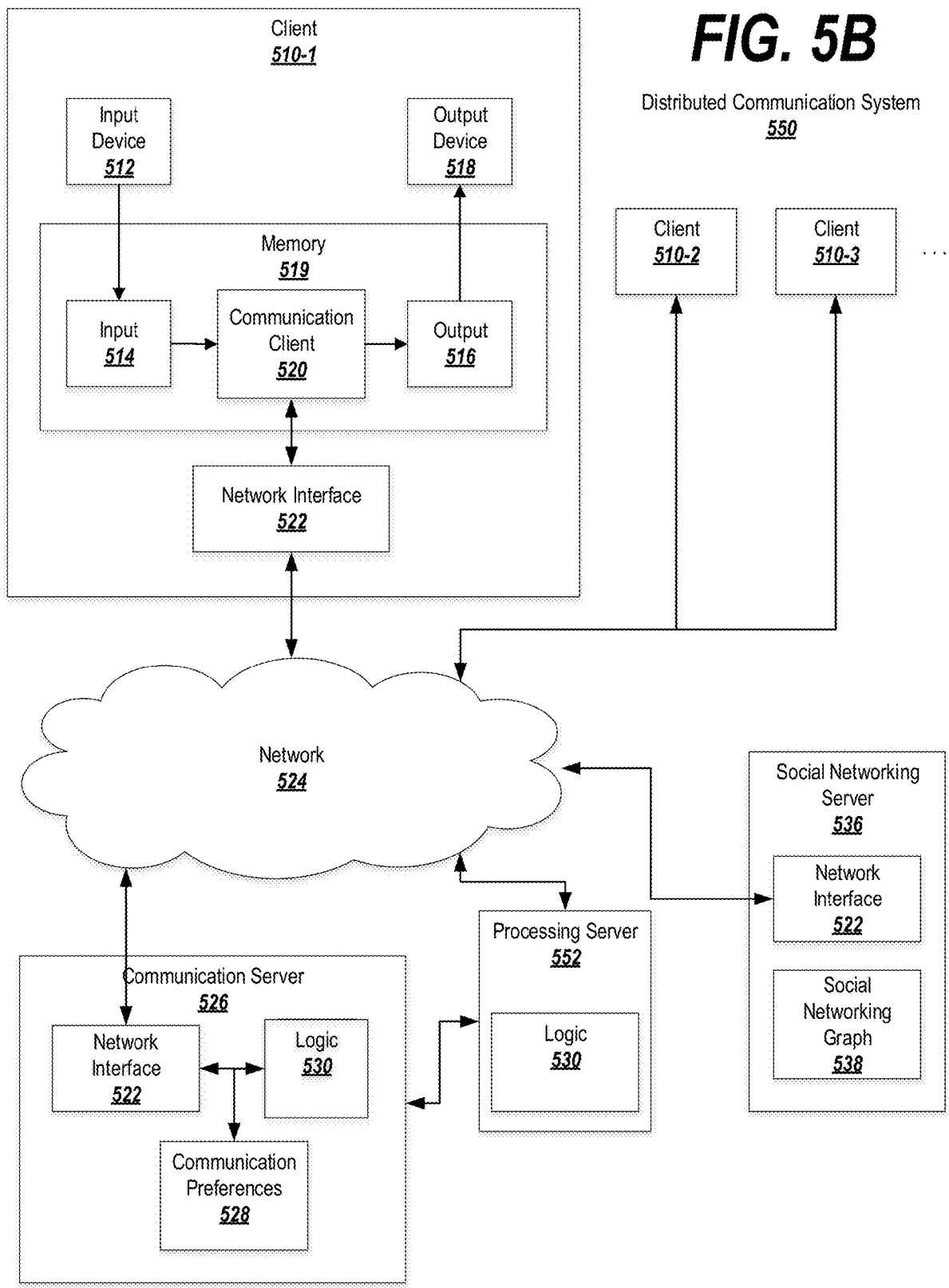
FIG. 5B is a block diagram providing an overview of a system including an exemplary distributed communications service.
Figure 5C:
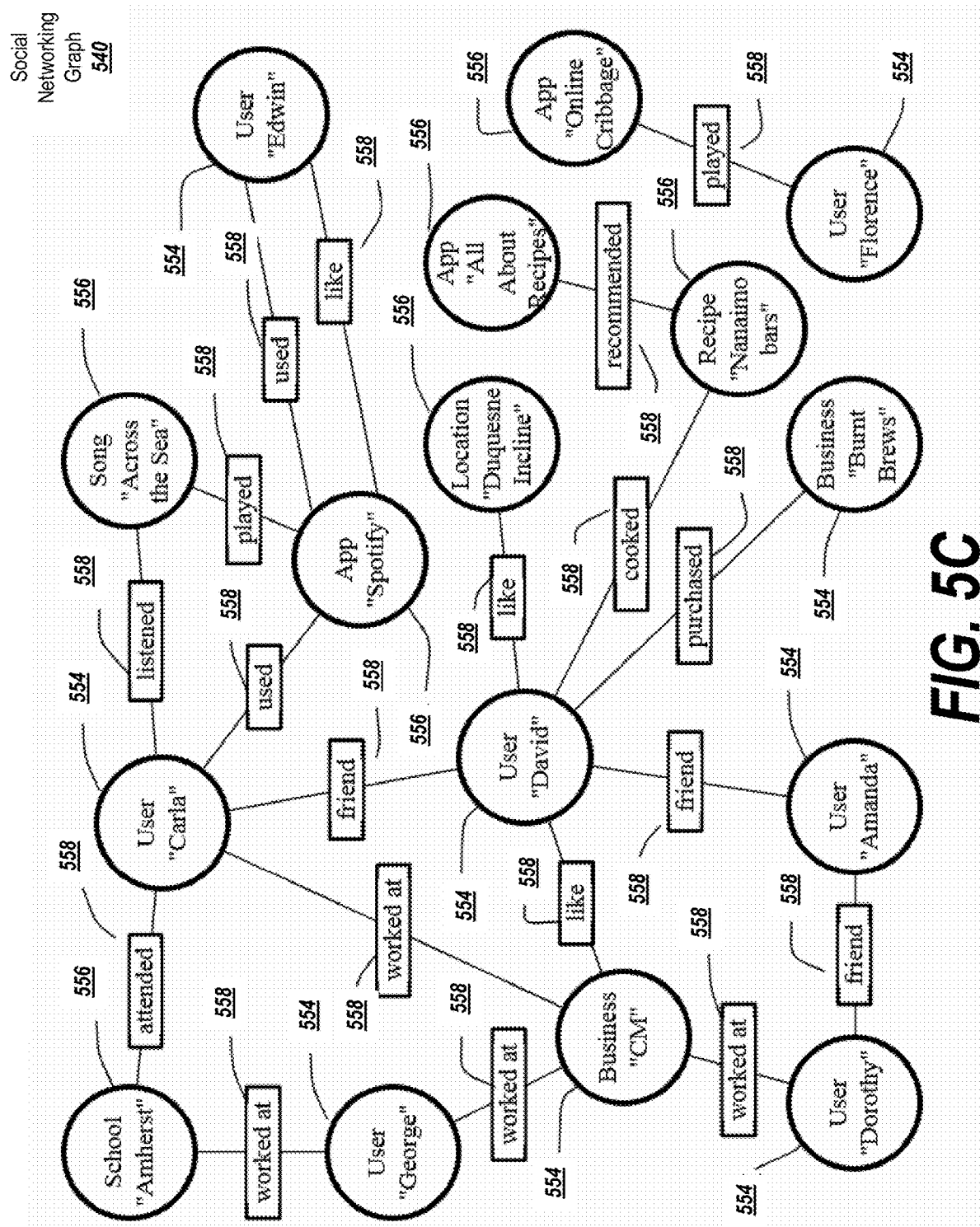
FIG. 5C depicts the social networking graph of FIGS. 5A-5B in more detail.

These examples may be implemented by a communications system that is provided either locally, at a client device, or remotely (e.g., at a remote server). FIGS. 5A-5C depict various examples of communications systems, and are discussed in more detail below.

FIG. 5A depicts an exemplary centralized communication system 500, in which functionality such as that described above is integrated into a communication server. The centralized system 500 may implement some or all of the structure and/or operations of a communication service in a single computing entity, such as entirely within a single centralized server device 526.

The communication system 500 may include a computer-implemented system having software applications that include one or more components. Although the communication system 500 shown in FIG. 5A has a limited number of elements in a certain topology, the communication system 500 may include more or fewer elements in alternate topologies.

A communication service 500 may be generally arranged to receive, store, and deliver messages. The communication service 500 may store messages or video communications while clients 520, such as may execute on client devices 510, are offline and deliver the messages/communications once the clients are available. Alternatively or in addition, the clients 520 may include social networking functionality.

A client device 510 may transmit messages addressed to a recipient user, user account, or other identifier resolving to a receiving client device 510. In exemplary embodiments, each of the client devices 510 and their respective communication clients 520 are associated with a particular user or users of the communication service 500. In some embodiments, the client devices 510 may be cellular devices such as smartphones and may be identified to the communication service 500 based on a phone number associated with each of the client devices 510. In some embodiments, each communication client may be associated with a user account registered with the communication service 500. In general, each communication client may be addressed through various techniques for the reception of messages. While in some embodiments the client devices 510 may be cellular devices, in other embodiments one or more of the client devices 510 may be personal computers, tablet devices, any other form of computing device.

The client 510 may include one or more input devices 512 and one or more output devices 518. The input devices 512 may include, for example, microphones, keyboards, cameras, electronic pens, touch screens, and other devices for receiving inputs including message data, requests, commands, user interface interactions, selections, and other types of input. The output devices 518 may include a speaker, a display device such as a monitor or touch screen, and other devices for presenting an interface to the communication system 500.

The client 510 may include a memory 519, which may be a non-transitory computer readable storage medium, such as one or a combination of a hard drive, solid state drive, flash storage, read only memory, or random access memory. The memory 519 may a representation of an input 514 and/or a representation of an output 516, as well as one or more applications. For example, the memory 519 may store a communication client 520 and/or a social networking client that allows a user to interact with a social networking service.

The input 514 may be textual, such as in the case where the input device 212 is a keyboard. Alternatively, the input 514 may be an audio recording, such as in the case where the input device 512 is a microphone. Accordingly, the input 514 may be subjected to automatic speech recognition (ASR) logic in order to transform the audio recording to text that is processable by the communication system 500. The ASR logic may be located at the client device 510 (so that the audio recording is processed locally by the client 510 and corresponding text is transmitted to the communication server 526), or may be located remotely at the communication server 526 (in which case, the audio recording may be transmitted to the communication server 526 and the communication server 526 may process the audio into text). Other combinations are also possible—for example, if the input device 512 is a touch pad or electronic pen, the input 514 may be in the form of handwriting, which may be subjected to handwriting or optical character recognition analysis logic in order to transform the input 512 into processable text.

The client 510 may be provided with a network interface 522 for communicating with a network 524, such as the Internet. The network interface 522 may transmit the input 512 in a format and/or using a protocol compatible with the network 524 and may receive a corresponding output 516 from the network 524.

The network interface 522 may communicate through the network 524 to a communication server 526. The communication server 526 may be operative to receive, store, and forward communications between clients.

The communication server 526 may include a network interface 522, communication preferences 528, and communications logic 530. The communication preferences 528 may include one or more privacy settings or other preferences for one or more users and/or message threads. Furthermore, the communication preferences 528 may include one or more settings, including default settings, for the logic described herein.

The communications logic 530 may include logic for implementing any or all of the above-described features of the present invention. Alternatively or in addition, some or all of the features may be implemented at the client 510-*i*, such as by being incorporated into an application such as the communication client 520.

The network interface 522 of the client 510 and/or the communication server 526 may also be used to communicate through the network 524 with an app server 540. The app server may store software or applications in an app library 544, representing software available for download by the client 510-*i* and/or the communication server 526 (among other entities). An app in the app library 544 may fully or partially implement the embodiments described herein. Upon receiving a request to download software incorporating exemplary embodiments, app logic 542 may identify a corresponding app in the app library 544 and may provide (e.g., via a network interface) the app to the entity that requested the software.

The network interface 522 of the client 510 and/or the communication server 526 may also be used to communicate through the network 524 with a social networking server 536. The social networking server 536 may include or may interact with a social networking graph 538 that defines connections in a social network. Furthermore, the communication server 526 may connect to the social networking server 536 for various purposes, such as retrieving connection information, communication history, event details, etc. from the social network.

A user of the client 510 may be an individual (human user), an entity (e.g., an enterprise, business, or third-party application), or a group (e.g., of individuals or entities) that interacts or communicates with or over the social networking server 536. The social-networking server 536 may be a network-addressable computing system hosting an online social network. The social networking server 536 may generate, store, receive, and send social-networking data, such as, for example, user-profile data, concept-profile data, social-graph information, or other suitable data related to the online social network. The social networking server 536 may be accessed by the other components of the network environment either directly or via the network 524.

The social networking server 536 may include an authorization server (or other suitable component(s)) that allows users to opt in to or opt out of having their actions logged by social-networking server 536 or shared with other systems (e.g., third-party systems, such as the communication server 526), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 536 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 538. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 536 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 536 may send a request to the data store for the object. The request may identify the user associated with the request. The requested data object may only be sent to the user (or a client system 510 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social-networking server 536 or explicit connections of a user to a node, object, entity, brand, or page on social networking server 536. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for a Soda Company?"); lightweight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 5A may be well-suited to deployment as a new system or as an upgrade to an existing system, because the logic for implementing exemplary embodiments is incorporated into the communication server 526. In contrast, FIG. 5B depicts an exemplary distributed communication system 550, in which functionality for implementing exemplary embodiments is distributed and remotely accessible from the communication server. Examples of a distributed communication system 550 include a client-server architecture, a 3-tier architecture, an N-tier architecture, a tightly-coupled or clustered architecture, a peer-to-peer architecture, a master-slave architecture, a shared database architecture, and other types of distributed systems.

Many of the components depicted in FIG. 5B are identical to those in FIG. 5A, and a description of these elements is not repeated here for the sake of brevity (the app server 540 is omitted from the Figure for ease of discussion, although it is understood that this embodiment may also employ an app server 540). The primary difference between the centralized embodiment and the distributed embodiment is the addition of a separate processing server 552, which hosts the logic 530 for implementing exemplary embodiments. The processing server 552 may be distinct from the communication server 526 but may communicate with the communication server 526, either directly or through the network 524, to provide the functionality of the logic 530 and the logic 534 to the communication server 526.

The embodiment depicted in FIG. 5B may be particularly well suited to allow exemplary embodiments to be deployed alongside existing communication systems, for example when it is difficult or undesirable to replace an existing communication server. Additionally, in some cases the communication server 526 may have limited resources (e.g. processing or memory resources) that limit or preclude the addition of the additional pivot functionality. In such situations, the capabilities described herein may still be provided through the separate processing server 552.

In still further embodiments, the logic 532 may be provided locally at the client 510-*i*, for example as part of the communication client 520. In these embodiments, each client 510-*i* makes its own determination as to which messages belong to which thread, and how to update the display and issue notifications. As a result, different clients 510-*i* may display the same conversation differently, depending on local settings (for example, the same messages may be assigned to different threads, or similar threads may have different parents or highlights).

FIG. 5C illustrates an example of a social networking graph 538. In exemplary embodiments, a social networking service may store one or more social graphs 538 in one or more data stores as a social graph data structure via the social networking service.

The social graph 538 may include multiple nodes, such as user nodes 554 and concept nodes 556. The social graph 228 may furthermore include edges 558 connecting the nodes. The nodes and edges of social graph 228 may be stored as data objects, for example, in a data store (such as a social-graph database). Such a data store may include one or more searchable or queryable indexes of nodes or edges of social graph 228.

The social graph 538 may be accessed by a social-networking server 226, client system 210, third-party system (e.g., the translation server 224), or any other approved system or device for suitable applications.

A user node 554 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 554 corresponding to the user, and store the user node 30 in one or more data stores. Users and user nodes 554 described herein may, where appropriate, refer to registered users and user nodes 554 associated with registered users. In addition or as an alternative, users and user nodes 554 described herein may, where appropriate, refer to users that have not registered with the social-networking system. In particular embodiments, a user node 554 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 554 may be associated with one or more data objects corresponding to information associated with a user. In particular embodiments, a user node 554 may correspond to one or more webpages. A user node 554 may be associated with a unique user identifier for the user in the social-networking system.

In particular embodiments, a concept node 556 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 556 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 556 may be associated with one or more data objects corresponding to information associated with concept node 556. In particular embodiments, a concept node 556 may correspond to one or more webpages.

In particular embodiments, a node in social graph 538 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 556. Profile pages may be viewable by all or a selected subset of other users. As an example and not by way of limitation, a user node 554 may have a corresponding user-profile page in which the corresponding user may add content, make declarations, or otherwise express himself or herself. A business page such as business page 205 may comprise a user-profile page for a commerce entity. As another example and not by way of limitation, a concept node 556 may have a corresponding concept-profile page in which one or more users may add content, make declarations, or express themselves, particularly in relation to the concept corresponding to concept node 556.

In particular embodiments, a concept node 556 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 554 corresponding to the user and a concept node 556 corresponding to the third-party webpage or resource and store edge 558 in one or more data stores.

In particular embodiments, a pair of nodes in social graph 538 may be connected to each other by one or more edges 558. An edge 558 connecting a pair of nodes may represent a relationship between the pair of nodes. In particular embodiments, an edge 558 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 558 connecting the first user's user node 554 to the second user's user node 554 in social graph 538 and store edge 558 as social-graph information in one or more data stores. In the example of FIG. 5C, social graph 538 includes an edge 558 indicating a friend relation between user nodes 554 of user "Amanda" and user "Dorothy." Although this disclosure describes or illustrates particular edges 558 with particular attributes connecting particular user nodes 554, this disclosure contemplates any suitable edges 558 with any suitable attributes connecting user nodes 554. As an example and not by way of limitation, an edge 558 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 538 by one or more edges 558.

In particular embodiments, an edge 558 between a user node 554 and a concept node 556 may represent a particular action or activity performed by a user associated with user node 554 toward a concept associated with a concept node 556. As an example and not by way of limitation, as illustrated in FIG. 5C, a user may "like," "attended," "played," "listened," "cooked," "worked at," or "watched" a concept, each of which may correspond to a edge type or subtype. A concept-profile page corresponding to a concept node 556 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (Music Service, which is an online music application). In this case, the social-networking system may create a "listened" edge 558 and a "used" edge (as illustrated in FIG. 5C) between user nodes 554 corresponding to the user and concept nodes 556 corresponding to the song and application to indicate that the user listened to the song and used the application. Moreover, the social-networking system may create a "played" edge 558 (as illustrated in FIG. 5C) between concept nodes 556 corresponding to the song and the application to indicate that the particular song was played by the particular application. In this case, "played" edge 558 corresponds to an action performed by an external application (Music Service) on an external audio file (the song "Across the Sea"). Although this disclosure describes particular edges 558 with particular attributes connecting user nodes 554 and concept nodes 556, this disclosure contemplates any suitable edges 558 with any suitable attributes connecting user nodes 554 and concept nodes 556. Moreover, although this disclosure describes edges between a user node 554 and a concept node 556 representing a single relationship, this disclosure contemplates edges between a user node 554 and a concept node 556 representing one or more relationships. As an example and not by way of limitation, an edge 558 may represent both that a user likes and has used at a particular concept. Alternatively, another edge 558 may represent each type of relationship (or multiples of a single relationship) between a user node 554 and a concept node 556 (as illustrated in FIG. 5C between user node 554 for user "Edwin" and concept node 556 for "Music Service").

In particular embodiments, the social-networking system may create an edge 558 between a user node 554 and a concept node 556 in social graph 538. As an example and not by way of limitation, a user viewing a concept-profile page (such as, for example, by using a web browser or a special-purpose application hosted by the user's client system) may indicate that he or she likes the concept represented by the concept node 556 by clicking or selecting a "Like" icon, which may cause the user's client system to send to the social-networking system a message indicating the user's liking of the concept associated with the concept-profile page. In response to the message, the social-networking system may create an edge 558 between user node 554 associated with the user and concept node 556, as illustrated by "like" edge 558 between the user and concept node 556. In particular embodiments, the social-networking system may store an edge 558 in one or more data stores. In particular embodiments, an edge 558 may be automatically formed by the social-networking system in response to a particular user action. As an example and not by way of limitation, if a first user uploads a picture, watches a movie, or listens to a song, an edge 558 may be formed between user node 554 corresponding to the first user and concept nodes 556 corresponding to those concepts. Although this disclosure describes forming particular edges 558 in particular manners, this disclosure contemplates forming any suitable edges 558 in any suitable manner.

The social graph 538 may further comprise a plurality of product nodes. Product nodes may represent particular products that may be associated with a particular business. A business may provide a product catalog to a consumer-to-business service and the consumer-to-business service may therefore represent each of the products within the product in the social graph 538 with each product being in a distinct product node. A product node may comprise information relating to the product, such as pricing information, descriptive information, manufacturer information, availability information, and other relevant information. For example, each of the items on a menu for a restaurant may be represented within the social graph 538 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 538. The information for a product node may be manipulated by the social-networking system as a product object that encapsulates information regarding the referenced product.

As such, the social graph 538 may be used to infer shared interests, shared experiences, or other shared or common attributes of two or more users of a social-networking system. For instance, two or more users each having an edge to a common business, product, media item, institution, or other entity represented in the social graph 538 may indicate a shared relationship with that entity, which may be used to suggest customization of a use of a social-networking system, including a messaging system, for one or more users.

The embodiments described above may be performed by a messaging architecture, an example of which is next described with reference to FIG. 6.

Messaging Architecture

Figure 6:
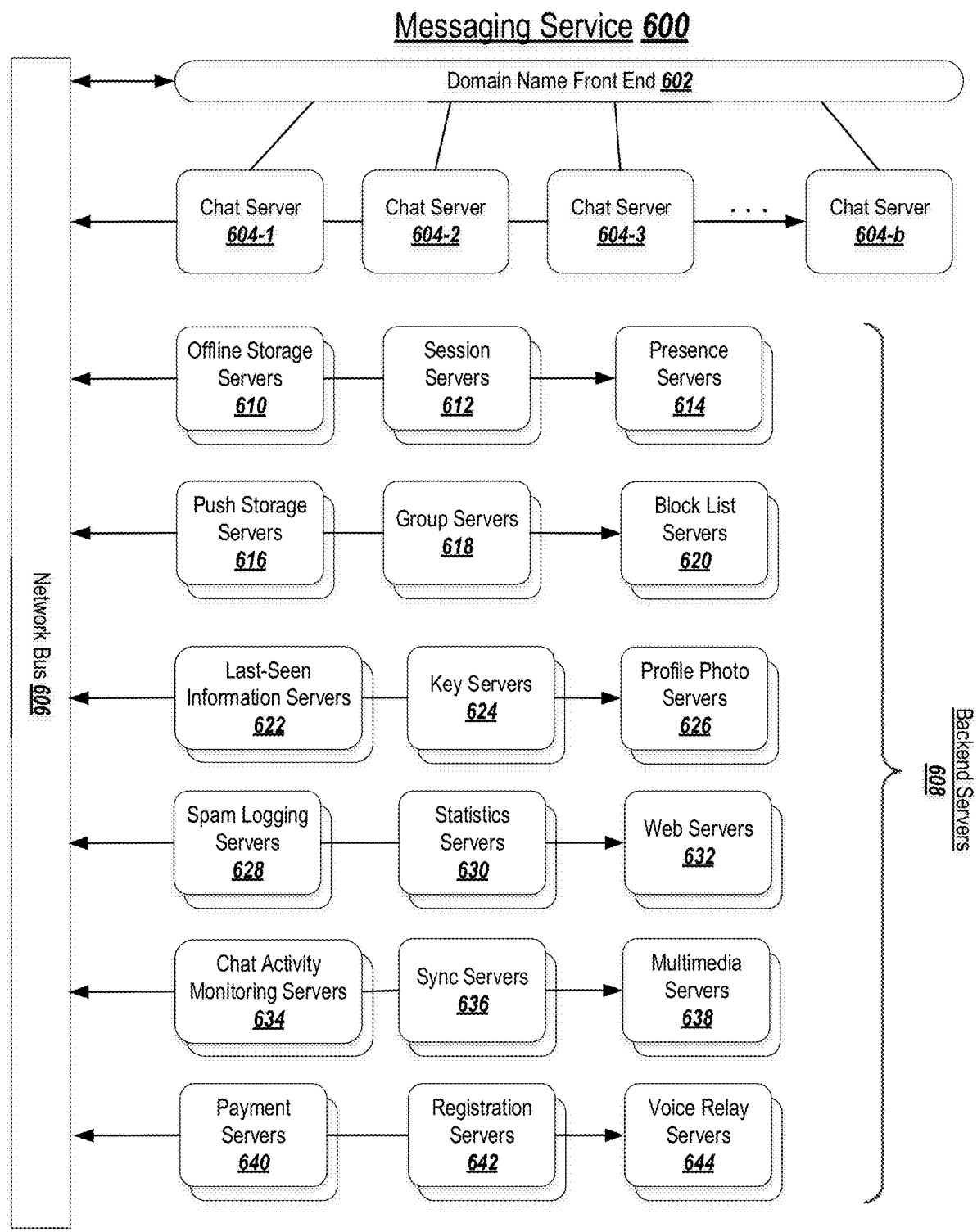
FIG. 6 is a block diagram depicting an example of a system for a messaging service.

FIG. 6 illustrates an embodiment of a plurality of servers implementing various functions of a messaging service 600. It will be appreciated that different distributions of work and functions may be used in various embodiments of a messaging service 600.

The messaging service 600 may comprise a domain name front end 602. The domain name front end 602 may be assigned one or more domain names associated with the messaging service 600 in a domain name system (DNS). The domain name front end 602 may receive incoming connections and distribute the connections to servers providing various messaging services.

The messaging service 602 may comprise one or more chat servers 604. The chat servers 604 may comprise front-end servers for receiving and transmitting user-to-user messaging updates such as chat messages. Incoming connections may be assigned to the chat servers 604 by the domain name front end 602 based on workload balancing.

The messaging service 600 may comprise backend servers 608. The backend servers 608 may perform specialized tasks in the support of the chat operations of the front-end chat servers 604. A plurality of different types of backend servers 608 may be used. It will be appreciated that the assignment of types of tasks to different backend serves 608 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 600 may comprise one or more offline storage servers 610. The one or more offline storage servers 610 may store messaging content for currently-offline messaging clients in hold for when the messaging clients reconnect.

The messaging service 600 may comprise one or more sessions servers 612. The one or more session servers 612 may maintain session state of connected messaging clients.

The messaging service 600 may comprise one or more presence servers 614. The one or more presence servers 614 may maintain presence information for the messaging service 600. Presence information may correspond to user-specific information indicating whether or not a given user has an online messaging client and is available for chatting, has an online messaging client but is currently away from it, does not have an online messaging client, and any other presence state.

The messaging service 600 may comprise one or more push storage servers 616. The one or more push storage servers 616 may cache push requests and transmit the push requests to messaging clients. Push requests may be used to wake messaging clients, to notify messaging clients that a messaging update is available, and to otherwise perform server-side-driven interactions with messaging clients.

The messaging service 600 may comprise one or more group servers 618. The one or more group servers 618 may maintain lists of groups, add users to groups, remove users from groups, and perform the reception, caching, and forwarding of group chat messages.

The messaging service 600 may comprise one or more block list servers 620. The one or more block list servers 620 may maintain user-specific block lists, the user-specific incoming-block lists indicating for each user the one or more other users that are forbidden from transmitting messages to that user. Alternatively or additionally, the one or more block list servers 620 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 600 may comprise one or more last seen information servers 622. The one or more last seen information servers 622 may receive, store, and maintain information indicating the last seen location, status, messaging client, and other elements of a user's last seen connection to the messaging service 600.

The messaging service 600 may comprise one or more key servers 624. The one or more key servers may host public keys for public/private key encrypted communication.

The messaging service 600 may comprise one or more profile photo servers 626. The one or more profile photo servers 626 may store and make available for retrieval profile photos for the plurality of users of the messaging service 600.

The messaging service 600 may comprise one or more spam logging servers 628. The one or more spam logging servers 628 may log known and suspected spam (e.g., unwanted messages, particularly those of a promotional nature). The one or more spam logging servers 628 may be operative to analyze messages to determine whether they are spam and to perform punitive measures, in some embodiments, against suspected spammers (users that send spam messages).

The messaging service 600 may comprise one or more statistics servers 630. The one or more statistics servers may compile and store statistics information related to the operation of the messaging service 600 and the behavior of the users of the messaging service 600.

The messaging service 600 may comprise one or more web servers 632. The one or more web servers 632 may engage in hypertext transport protocol (HTTP) and hypertext transport protocol secure (HTTPS) connections with web browsers.

The messaging service 600 may comprise one or more chat activity monitoring servers 634. The one or more chat activity monitoring servers 634 may monitor the chats of users to determine unauthorized or discouraged behavior by the users of the messaging service 600. The one or more chat activity monitoring servers 634 may work in cooperation with the spam logging servers 628 and block list servers 620, with the one or more chat activity monitoring servers 634 identifying spam or other discouraged behavior and providing spam information to the spam logging servers 628 and blocking information, where appropriate to the block list servers 620.

The messaging service 600 may comprise one or more sync servers 636. The one or more sync servers 636 may sync the messaging system 500 with contact information from a messaging client, such as an address book on a mobile phone, to determine contacts for a user in the messaging service 600.

The messaging service 600 may comprise one or more multimedia servers 638. The one or more multimedia servers may store multimedia (e.g., images, video, audio) in transit between messaging clients, multimedia cached for offline endpoints, and may perform transcoding of multimedia.

The messaging service 600 may comprise one or more payment servers 640. The one or more payment servers 640 may process payments from users. The one or more payment servers 640 may connect to external third-party servers for the performance of payments.

The messaging service 600 may comprise one or more registration servers 642. The one or more registration servers 642 may register new users of the messaging service 600.

The messaging service 600 may comprise one or more voice relay servers 644. The one or more voice relay servers 644 may relay voice-over-internet-protocol (VoIP) voice communication between messaging clients for the performance of VoIP calls.

Figure 7:
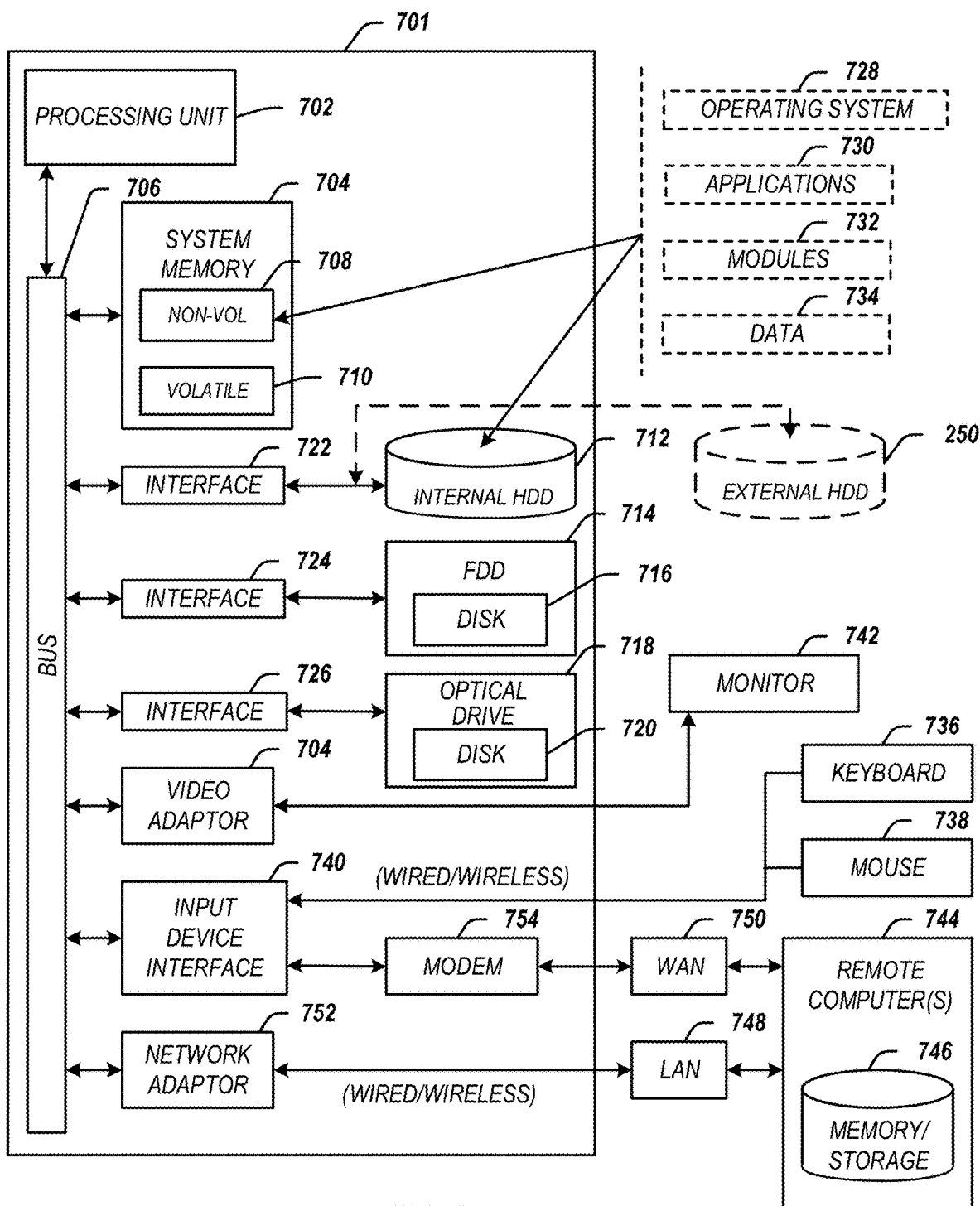
FIG. 7 is a block diagram illustrating an exemplary computing device suitable for use with exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an Athlon®, Duron® and Opteron® processors; embedded and secure processors; DragonBall® and PowerPC® processors; Cell processors; Celeron®, Core (2) Duo®, Itanium®, Pentium®, Xeon®, and XScale® processors; and similar processors. Dual microprocessors, multi-core processors, and other multi-processor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the messaging system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
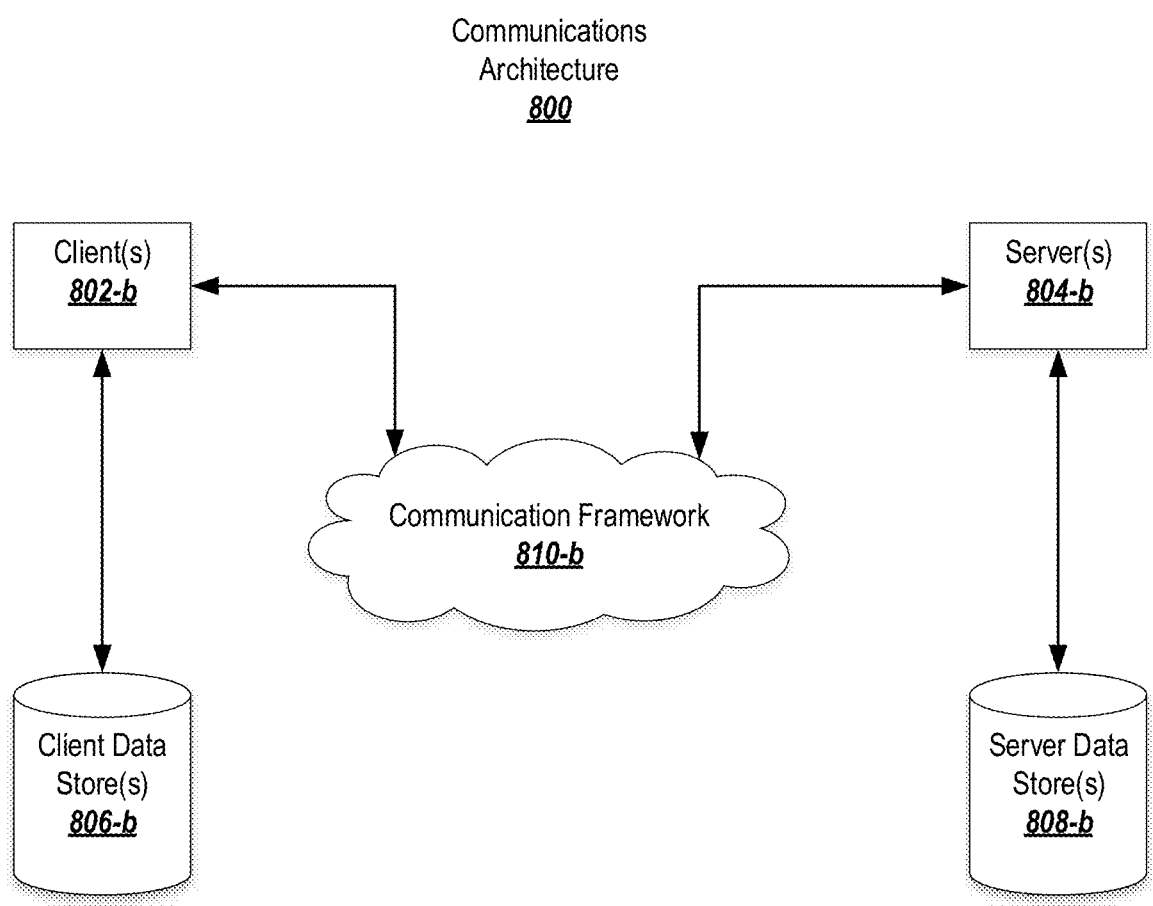
FIG. 8 depicts an exemplary communication architecture.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device 510. The servers 804 may implement the server device 526. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 9:
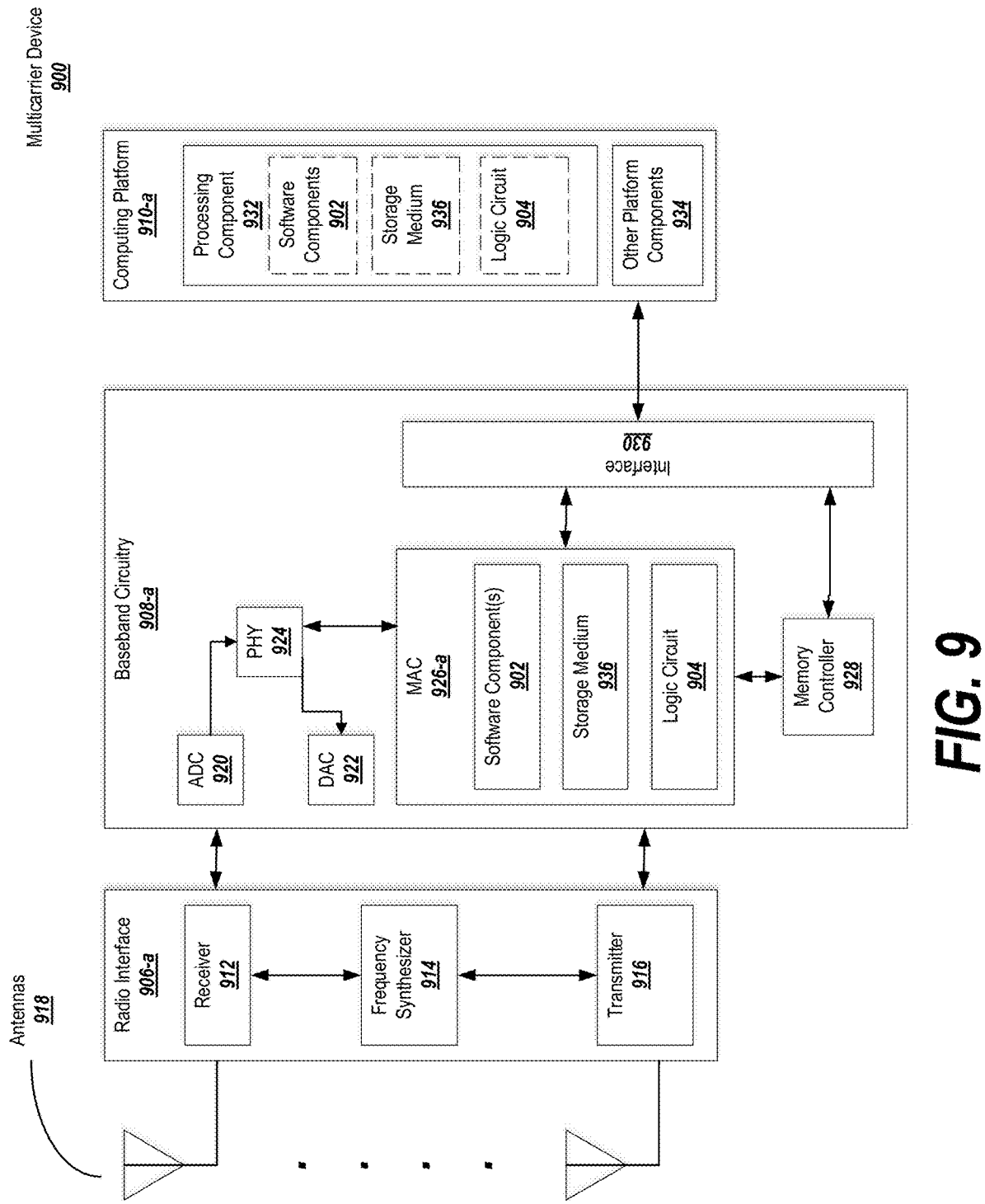
FIG. 9 is a block diagram depicting an exemplary multicarrier communications device.

FIG. 9 illustrates an embodiment of a device 900 for use in a multicarrier OFDM system, such as the messaging system 500. The device 900 may implement, for example, software components 902 as described with reference to the messaging component logic 600, the intent determination logic 700, and the group selection logic 800. The device 900 may also implement a logic circuit 904. The logic circuit 904 may include physical circuits to perform operations described for the messaging system 600. As shown in FIG. 9, device 900 may include a radio interface 906, baseband circuitry 908, and a computing platform 910, although embodiments are not limited to this configuration.

The device 900 may implement some or all of the structure and/or operations for the messaging system 500 and/or logic circuit 904 in a single computing entity, such as entirely within a single device. Alternatively, the device 900 may distribute portions of the structure and/or operations for the messaging system 600 and/or logic circuit 904 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 906 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 906 may include, for example, a receiver 912, a transmitter 914 and/or a frequency synthesizer 916. The radio interface 906 may include bias controls, a crystal oscillator and/or one or more antennas 918. In another embodiment, the radio interface 906 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 908 may communicate with the radio interface 906 to process receive and/or transmit signals and may include, for example, an analog-to-digital converter 920 for down converting received signals, and a digital-to-analog converter 922 for up-converting signals for transmission. Further, the baseband circuitry 908 may include a baseband or physical layer (PHY) processing circuit 924 for PHY link layer processing of respective receive/transmit signals. The baseband circuitry 908 may include, for example, a processing circuit 926 for medium access control (MAC)/data link layer processing. The baseband circuitry 908 may include a memory controller 928 for communicating with the processing circuit 926 and/or a computing platform 910, for example, via one or more interfaces 930.

In some embodiments, the PHY processing circuit 924 may include a frame construction and/or detection module, in combination with additional circuitry such as a buffer memory, to construct and/or deconstruct communication frames, such as radio frames. Alternatively or in addition, the MAC processing circuit 926 may share processing for certain of these functions or perform these processes independent of the PHY processing circuit 924. In some embodiments, MAC and PHY processing may be integrated into a single circuit.

The computing platform 910 may provide computing functionality for the device 900. As shown, the computing platform 910 may include a processing component 932. In addition to, or alternatively of, the baseband circuitry 908, the device 900 may execute processing operations or logic for the messaging system 500 and logic circuit 904 using the processing component 932. The processing component 932 (and/or the PHY 924 and/or MAC 926) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 910 may further include other platform components 934. Other platform components 934 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 900 described herein, may be included or omitted in various embodiments of the device 900, as suitably desired. In some embodiments, the device 900 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 900 may be implemented using single input single output (SISO) architectures. However, certain implementations may include multiple antennas (e.g., antennas 918) for transmission and/or reception using adaptive antenna techniques for beamforming or spatial division multiple access (SDMA) and/or using MIMO communication techniques.

The components and features of the device 900 may be implemented using any combination of discrete circuitry, application specific integrated circuits (ASICs), logic gates and/or single chip architectures. Further, the features of the device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 936 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
accessing information related to a coordinated interaction associated with a plurality of users, the coordinated interaction associated with at least a data channel for carrying interaction data and a real time communication (RTC) channel;
receiving, from a device associated with a first user of the plurality of users, an instruction in the RTC channel to initiate a coordinated effect, the effect altering the coordinated interaction as applied to at least a second user of the plurality of users different from the first user;
forwarding the instruction to a device associated with the second user;
receiving, from the device associated with the second user on the RTC channel, an agreement to initiate the coordinated effect;
forwarding the agreement to the device associated with the first user; and
receiving a delay request from the device associated with the second user, the delay request indicating that the device associated with the second user requires additional data before initiating the coordinated effect.

2. The method of claim 1, further comprising receiving, from the device associated with the first user or the device associated with the second user, an application programming interface (API) call including generic data, the generic data applicable to the coordinated effect.

3. The method of claim 2, further comprising determining if the API call is transmitted in an unreliable mode or a reliable mode, wherein:
the generic data is forwarded to the device associated to the second user without a delivery guarantee if the API call is transmitted in the unreliable mode, or
the generic data is retransmitted to the device associated to the second user if no acknowledgement of receipt of the generic data is received within a predetermined amount of time if the API call is transmitted in the reliable mode.

4. The method of claim 1, wherein the coordinated interaction comprises a video exchange, the interaction data comprises video data, and the coordinated effect graphically modifies the video data.

5. The method of claim 1, further comprising receiving, from the device associated with the first user or the device associated with the second user, a call to a service providing a functionality for supporting the coordinated effect, the call comprising data of a predefined type associated with the service.

6. The method of claim 5, wherein the functionality comprises one or more of: a turn negotiation, turn yielding, scorekeeping, or leadership selection.

7. A non-transitory computer-readable medium storing instructions configured to cause one or more processors to:
access information related to a coordinated interaction associated with a plurality of users, the coordinated interaction associated with at least a data channel for carrying interaction data and a real time communication (RTC) channel;
receive, from a device associated with a first user of the plurality of users, an instruction in the RTC channel to initiate a coordinated effect, the effect altering the coordinated interaction as applied to at least a second user of the plurality of users different from the first user;
forward the instruction to a device associated with the second user;
receive, from the device associated with the second user on the RTC channel, an agreement to initiate the coordinated effect;
forward the agreement to the device associated with the first user; and
receive a delay request from the device associated with the second user, the delay request indicating that the device associated with the second user requires additional data before initiating the coordinated effect.

8. The medium of claim 7, further storing instructions for receiving, from the device associated with the first user or the device associated with the second user, an application programming interface (API) call including generic data, the generic data applicable to the coordinated effect.

9. The medium of claim 8, further storing instructions for determining if the API call is transmitted in an unreliable mode or a reliable mode, wherein:
the generic data is forwarded to the device associated to the second user without a delivery guarantee if the API call is transmitted in the unreliable mode, or
the generic data is retransmitted to the device associated to the second user if no acknowledgement of receipt of the generic data is received within a predetermined amount of time if the API call is transmitted in the reliable mode.

10. The medium of claim 7, wherein the coordinated interaction comprises a video exchange, the interaction data comprises video data, and the coordinated effect graphically modifies the video data.

11. The medium of claim 7, further storing instructions for receiving, from the device associated with the first user or the device associated with the second user, a call to a service providing a functionality for supporting the coordinated effect, the call comprising data of a predefined type associated with the service.

12. The medium of claim 11, wherein the functionality comprises one or more of: a turn negotiation, turn yielding, scorekeeping, or leadership selection.

13. An apparatus comprising:
a hardware processor circuit configured to access information related to a coordinated interaction associated with a plurality of users, the coordinated interaction associated with at least a data channel for carrying interaction data and a real time communication (RTC) channel;
a network interface for communicating on a network;
instruction reception logic configured to receive, from a device associated with a first user of the plurality of users, an instruction in the RTC channel to initiate a coordinated effect, the effect altering the coordinated interaction as applied to at least a second user of the plurality of users different from the first user;
instruction forwarding logic configured to forward the instruction to a device associated with the second user;

agreement reception logic configured to receive, from the device associated with the second user on the RTC channel, an agreement to initiate the coordinated effect;

agreement forwarding logic configured to forward the agreement to the device associated with the first user; and delay logic configured to receive a delay request from the device associated with the second user, the delay request indicating that the device associated with the second user requires additional data before initiating the coordinated effect.

14. The apparatus of claim 13, further comprising data reception logic configured to receive, from the device associated with the first user or the device associated with the second user, an application programming interface (API) call including generic data, the generic data applicable to the coordinated effect.

15. The apparatus of claim 14, further comprising data forwarding logic configured to determine if the API call is transmitted in an unreliable mode or a reliable mode, wherein:

the generic data is forwarded to the device associated to the second user without a delivery guarantee if the API call is transmitted in the unreliable mode, or the generic data is retransmitted to the device associated to the second user if no acknowledgement of receipt of the generic data is received within a predetermined amount of time if the API call is transmitted in the reliable mode.

16. The apparatus of claim 13, wherein the coordinated interaction comprises a video exchange, the interaction data comprises video data, and the coordinated effect graphically modifies the video data.

17. The apparatus of claim 13, further comprising receiving, from the device associated with the first user or the device associated with the second user, a call to a service providing a functionality for supporting the coordinated effect, the call comprising data of a predefined type associated with the service.

* * * * *